United States Patent
Kwak et al.

(10) Patent No.: US 11,451,351 B2
(45) Date of Patent: Sep. 20, 2022

(54) METHOD FOR TRANSMITTING AND RECEIVING DOWNLINK DATA CHANNEL AND DEVICE THEREFOR

(71) Applicant: LG Electronics Inc., Seoul (KR)

(72) Inventors: Kyuhwan Kwak, Seoul (KR); Hyunho Lee, Seoul (KR); Seungmin Lee, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/646,419

(22) PCT Filed: Feb. 14, 2019

(86) PCT No.: PCT/KR2019/001838
§ 371 (c)(1),
(2) Date: Mar. 11, 2020

(87) PCT Pub. No.: WO2019/160363
PCT Pub. Date: Aug. 22, 2019

(65) Prior Publication Data
US 2020/0382247 A1    Dec. 3, 2020

Related U.S. Application Data

(60) Provisional application No. 62/634,702, filed on Feb. 23, 2018, provisional application No. 62/630,796, filed on Feb. 14, 2018.

(30) Foreign Application Priority Data

Mar. 20, 2018   (KR) .................. 10-2018-0031838

(51) Int. Cl.
*H04L 5/00* (2006.01)
*H04L 1/00* (2006.01)
*H04L 1/08* (2006.01)

(52) U.S. Cl.
CPC .......... *H04L 5/0044* (2013.01); *H04L 1/0013* (2013.01); *H04L 1/08* (2013.01);
(Continued)

(58) Field of Classification Search
CPC ....... H04L 5/0044; H04L 1/0013; H04L 1/08; H04L 5/0007; H04L 5/0042;
(Continued)

(56) References Cited

U.S. PATENT DOCUMENTS

2014/0071954 A1* 3/2014 Au .................... H04W 28/0205
                                                        370/336
2014/0119246 A1* 5/2014 Yin ...................... H04W 72/12
                                                        370/280
(Continued)

FOREIGN PATENT DOCUMENTS

EP        3280086       2/2018
JP      2010530709      9/2010
(Continued)

OTHER PUBLICATIONS

EP extended European search report, in European Appln. No. 19755201.1, dated Nov. 16, 2020, 9 pages.
(Continued)

*Primary Examiner* — Ajit Patel
*Assistant Examiner* — Wilfred Thomas
(74) *Attorney, Agent, or Firm* — Fish & Richardson P.C.

(57) ABSTRACT

Disclosed is a method by which a terminal receives a physical downlink shared channel (PDSCH) in a wireless communication system. Particularly, the method comprises: receiving a physical downlink control channel (PDCCH) for scheduling the PDSCH; acquiring, from the PDCCH, rate matching information for the PDSCH; and receiving the PDSCH at a plurality of transmission time intervals (TTIs) on the basis of the rate matching information, wherein the
(Continued)

rate matching information is identically used for the plurality of TTIs.

7 Claims, 17 Drawing Sheets

(52) U.S. Cl.
CPC .......... *H04L 5/0007* (2013.01); *H04L 5/0042* (2013.01); *H04L 5/0094* (2013.01)

(58) Field of Classification Search
CPC ... H04L 5/0094; H04L 1/1858; H04L 1/1864; H04L 5/0064; H04L 5/0055; H04L 27/26; H04L 5/00
See application file for complete search history.

(56) References Cited

U.S. PATENT DOCUMENTS

| | | | | |
|---|---|---|---|---|
| 2014/0198733 | A1* | 7/2014 | Yin | H04L 1/1812 370/329 |
| 2014/0204849 | A1* | 7/2014 | Chen | H04L 5/0044 370/329 |
| 2014/0328260 | A1* | 11/2014 | Papasakellariou | H04L 1/1887 370/329 |
| 2015/0245323 | A1* | 8/2015 | You | H04W 72/042 370/329 |
| 2017/0317794 | A1 | 11/2017 | You et al. | |
| 2018/0007709 | A1 | 1/2018 | Seo et al. | |
| 2018/0123769 | A1* | 5/2018 | Pelletier | H04L 5/0094 |
| 2019/0215710 | A1* | 7/2019 | Yi | H04L 5/0057 |
| 2020/0296707 | A1* | 9/2020 | Kim | H04W 72/12 |
| 2021/0119756 | A1* | 4/2021 | Takeda | H04L 5/0044 |

FOREIGN PATENT DOCUMENTS

| | | |
|---|---|---|
| JP | 2016531521 | 10/2016 |
| KR | 20130048229 | 5/2013 |
| KR | 1020160118905 | 10/2016 |
| KR | 20160041932 | 4/2018 |
| WO | WO2017038895 | 3/2017 |

OTHER PUBLICATIONS

LG Electronics, "Discussion on time-domain resource allocation," R1-1713186, 3GPP TSG RAN WG1 Meeting #90, Prague, Czech Republic, Aug. 21-25, 2017, 4 pages.
3$^{rd}$ Generation Partnership Project; Nokia Networks, Alcatel-Lucent, Alcatel-Lucent Shanghai Bell, "DCI design for NB-IoT" R1-161841, 3GPP TSG-RAN WG1, Sophia Antipolis, France, dated Mar. 22-24, 2016, 3 pages.
3rd Generation Partnership Project; InterDigital, "Short-TTI PDSCH Design," R1-1610007, 3GPP TSG RAN WG1, Busan, Korea, dated Apr. 11-15, 2016, 3 pages.
3rd Generation Partnership Project; Sharp, "Association timing for sTTI with different UL and DL lengths," R1-1609871, 3GPP TSG RAN WG1, Lisbon Portugal, dated Oct. 10-14, 2016, 3 pages.
3rd Generation Partnership Project; LG Electronics, "On DCI contents for NR," R1-1700495, 3GPP TSG RAN WG1, Spokane, USA, dated Jan. 16-20, 2017, 4 pages.
3rd Generation Partnership Project; LG Electronics, "Discussion on resource sharing between PDCCH and PDSCH," R1-1713169, 3GPP TSG RAN WG1, Prague, Czech Republic, dated Aug. 21/25, 2017, 4 pages.
3rd Generation Partnership Project; NTT Docomo, Inc., "Resource sharing between PDCCH and PDSCH," R1-1713933, 3GPP TSG RAN WG1, Prague, P.R. Czechia, dated Aug. 21/25, 2017, 3 pages.
3rd Generation Partnership Project; LG Electronics, "Discussion on rate matching for PDSC/PUSCH," R1-1717974, 3GPP TSG RAN WG1, Prague, CZ, dated Oct. 9-13, 2017, 11 pages.
3rd Generation Partnership Project; Nokia, Nokia Shanghai Bell, "On remaining details on DL control channel design," R1-1719948, 3GPP TSG-RAN WG1, Reno, Nevada (USA), dated Nov.-Dec. 1, 2017, 9 pages.
3rd Generation Partnership Project; Intel Corporation, "Remaining details on DL control channel design," R1-1720023, 3GPP TSG-RAN WG1, Reno, Nevada, dated Nov. 27-Dec. 1, 2017, 7 pages.
3rd Generation Partnership Project; Samsung, "On Rate Matching," R1-1720351, 3GPP TSG RAN WG1, Reno, USA, dated Nov. 27-Dec. 1, 2017, 8 pages.
3rd Generation Partnership Project; Ericcson, "Multiplexing sPDCCH with sPDSCH/PDSCH," R1-1720529, 3GPP TSG-RAN WG1, Reno, USA, Nov. 27-Dec. 1, 2017, 8 pages.
3$^{rd}$ Generation Partnership Project; InterDigital; "Short-TTI PDSCH Design," R1-162964, 3GPP TSG RAN WG1, Busan, Korea, dated Apr. 2016, 3 pages.
International Search Report in International Appln. No. PCT/KR2019/001838, dated Jun. 3, 2019, 21 pages.
Ericsson, "URLLC design for LTE," R1-1720534, 3GPP TSG-RAN WG1 #91, Reno, Nevada, USA, dated Nov. 27-Dec. 1, 2017, 7 pages.
Huawei, HiSilicon, "PDSCH reliability for URLLC," R1-1719407, 3GPP TSG RAN WG1 Meeting #91, Reno, USA, Nov. 27-Dec. 1, 2017, 8 pages.
JP Office Action in Japanese Appln. No. 2020-502365, dated Jan. 26, 2021, 6 pages (with English translation).
Samsung, "Corrections on Rate Matching," R1-1800462, 3GPP TSG RAN WG1 Meeting AH 1801, Vancouver, Canada, dated Jan. 22-26, 2018, 3 pages.
ZTE, Sanechips, "Candidate techniques for LTE URLLC," R1-1719668, 3GPP TSG RAN WG1 Meeting 91, Reno, USA, dated Nov. 27-Dec. 1, 2017, 6 pages.
ZTE, Sanechips, "Ultra-reliable part of URLLC for scheduling and HARQ procedure," R1-1719678, 3GPP TSG RAN WG1 Meeting 91, Reno, USA, dated Nov. 27-Dec. 1, 2017, 5 pages.
IN Office Action in Indian Appln. No. 201927054020, dated Apr. 9, 2021, 7 pages (with English translation).
Office Action in Japanese Appln. No. 2020-502365, dated Aug. 31, 2021, 4 pages (with English translation).
Office Action in Chinese Appln. No. 201980003995.8, dated Jun. 2, 2022, 10 pages (with English translation).

* cited by examiner

FIG. 2
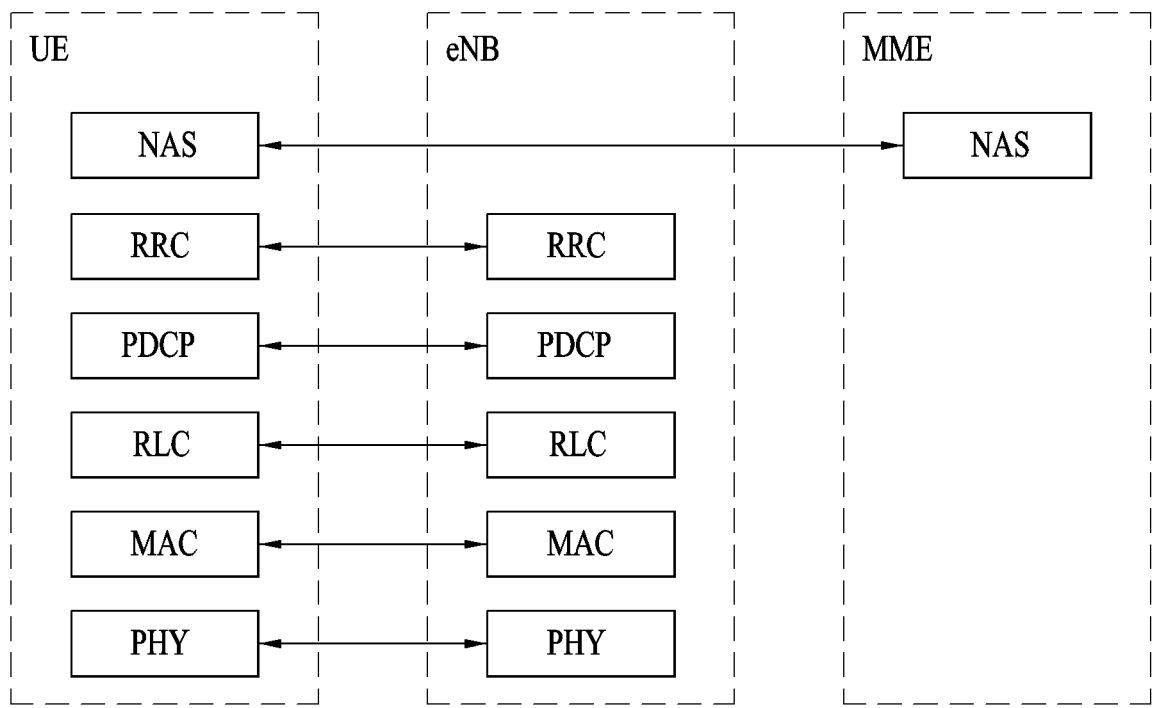
(A) CONTROL-PLANE PROTOCOL STACK
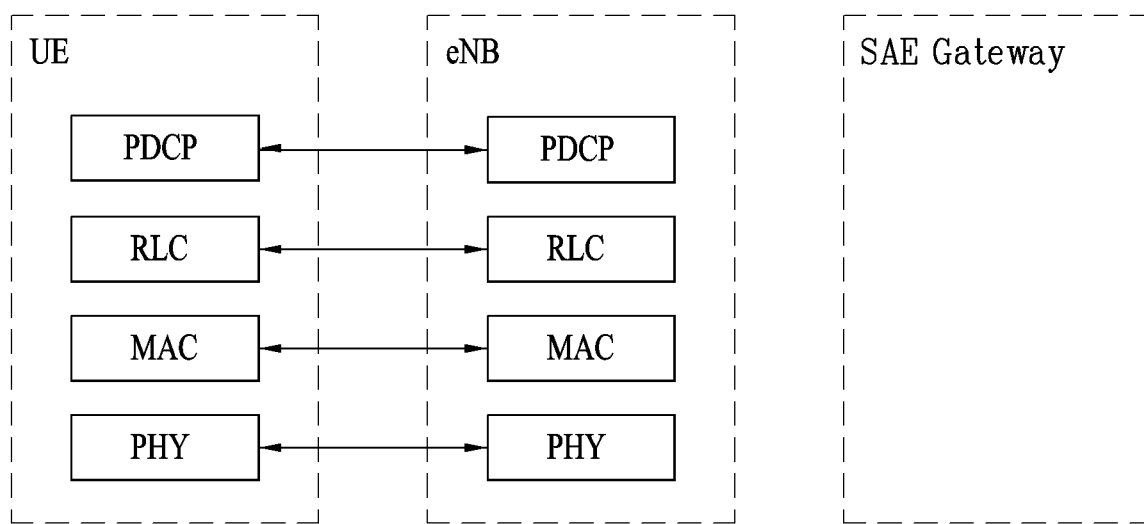
(B) USER-PLANE PROTOCOL STACK

FIG. 6
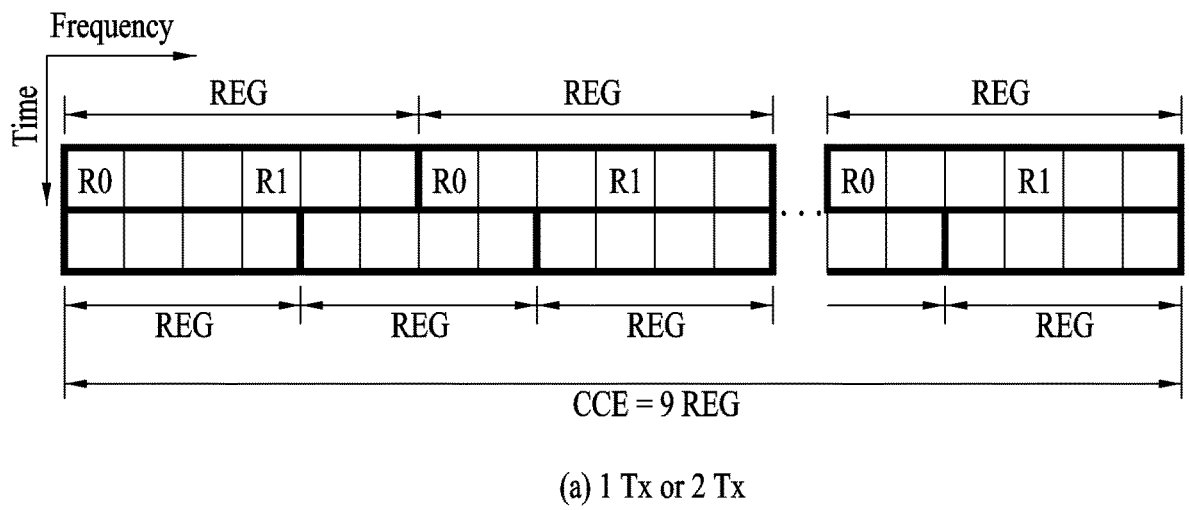
(a) 1 Tx or 2 Tx
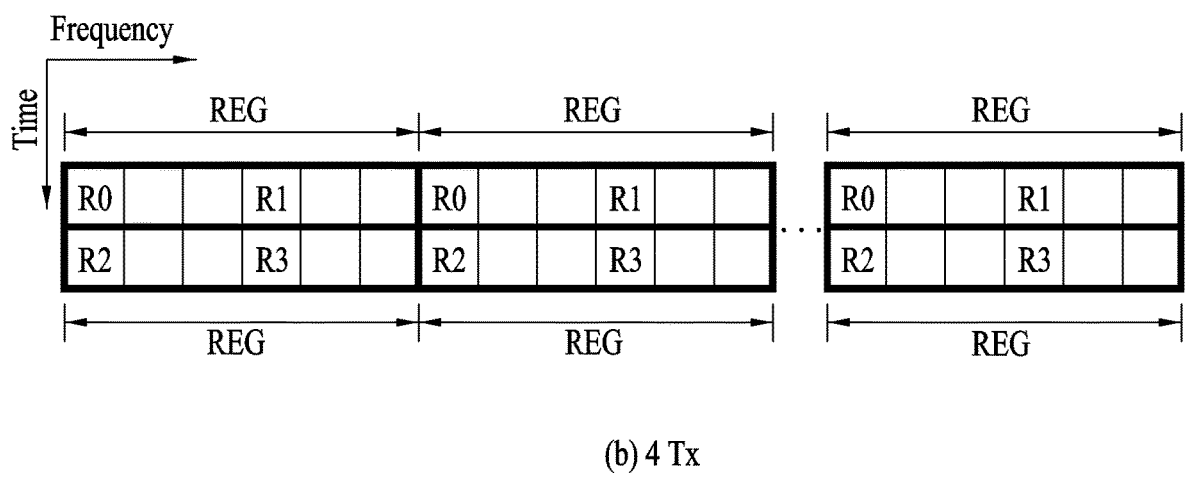
(b) 4 Tx

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 12

Resource allocation: 18 ACK/NACK channels with normal CP $\Delta_{shift}^{PUCCH} = 2$

| Cell specific cyclic shift offset | | | RS orthogonal cover | | | ACK/NACK orthogonal cover | | |
|---|---|---|---|---|---|---|---|---|
| $\delta_{offset}^{PUCCH} = 1$ | $\delta_{offset}^{PUCCH} = 0$ | $n_{CS} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | | | | | | | | |
| 2 | 1 | | n'=0 | | 12 | n'=0 | | 12 |
| 3 | 2 | | | 6 | 13 | | 6 | 13 |
| 4 | 3 | | 1 | 7 | 14 | 1 | 7 | 14 |
| 5 | 4 | | 2 | 8 | 15 | 2 | 8 | 15 |
| 6 | 5 | | 3 | 9 | 16 | 3 | 9 | 16 |
| 7 | 6 | | 4 | 10 | 17 | 4 | 10 | 17 |
| 8 | 7 | | | | | | | |
| 9 | 8 | | 5 | 11 | | 5 | 11 | |
| 10 | 9 | | | | | | | |
| 11 | 10 | | | | | | | |
| 0 | 11 | | | | | | | |

$\Delta_{shift}^{PUCCH} \in \{\{1,2,3\} \text{ for normal cyclic prefix}, \{1,2,3\} \text{ for extended cyclic prefix}\}$ $\delta_{offset}^{PUCCH} \in \{0,1,...,\Delta_{shift}^{PUCCH} - 1\}$ Cell specific cyclic shift offset Cell-specific Cyclic shift value of CAZAC sequence $n_{OC}$ : Orthogonal sequence index for ACK/NACK
$\bar{n}_{OC}$ : Orthogonal sequence index for RS
$n_{CS}$ : Cyclic shift value of a CAZAC sequence
n' : ACK/NACK resource index used for the channelization in a RB

FIG. 13

METHOD FOR TRANSMITTING AND RECEIVING DOWNLINK DATA CHANNEL AND DEVICE THEREFOR

CROSS-REFERENCE TO RELATED APPLICATIONS

This application is a National Stage application under 35 U.S.C. § 371 of International Application No. PCT/KR2019/001838, filed on Feb. 14, 2019, which claims the benefit of an earlier filing date and right of priority to Korean Application No. 10-2018-0031838, filed on Mar. 20, 2018, U.S. Provisional Application No. 62/634,702, filed on Feb. 23, 2018, and U.S. Provisional Application No. 62/630,796, filed on Feb. 14, 2018. The disclosures of the prior applications are incorporated by reference in their entirety.

TECHNICAL FIELD

The present disclosure relates to a method for transmitting and receiving a downlink data channel and device therefor, and more particularly, to a method of transmitting and receiving a repeatedly transmitted downlink data channel based on rate matching information transmitted and received on a downlink control channel and device therefor.

BACKGROUND ART

A brief description will be given of a 3rd Generation Partnership Project Long Term Evolution (3GPP LTE) system as an example of a wireless communication system to which the present disclosure may be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARD) information, etc. by transmitting DL scheduling information to the UE. Regarding UL data, the eNB notifies a particular UE of a time-frequency area in which the UE may transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

The object of the present disclosure is to provide a method for transmitting and receiving a downlink data channel and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of receiving a physical downlink shared channel (PDSCH) by a user equipment (UE) in a wireless communication system. The method may include receiving a physical downlink control channel (PDCCH) for scheduling the PDSCH, obtaining rate matching information on the PDSCH from the PDCCH and receiving the PDSCH in a plurality of transmission time intervals (TTIs) based on the rate matching information. In this case, the rate matching information may be equally used in the plurality of TTIs.

The PDSCH may be repeatedly transmitted in the plurality of TTIs.

The PDSCH repeatedly transmitted in the plurality of TTIs may be for the same transport block (TB).

The number of times that the PDSCH is repeatedly transmitted may be obtained from the PDCCH.

Each of the TTIs may be a short TTI (sTTI).

The plurality of TTIs may be after a TTI in which the PDCCH is received.

In another aspect of the present disclosure, provided herein is a communication device for receiving a PDSCH in a wireless communication system. The communication device may include a memory and a processor connected to the memory. The processor may be configured to receive a PDCCH for scheduling the PDSCH, obtain rate matching information on the PDSCH from the PDCCH, and receive the PDSCH in a plurality of TTIs based on the rate matching information. The rate matching information may be equally used in the plurality of TTIs.

The PDSCH may be repeatedly transmitted in the plurality of TTIs.

The PDSCH repeatedly transmitted in the plurality of TTIs may be for the same TB.

The number of times that the PDSCH is repeatedly transmitted may be obtained from the PDCCH.

Each of the TTIs may be a sTTI.

The plurality of TTIs may be after a TTI in which the PDCCH is received.

In a further aspect of the present disclosure, provided herein is a method of transmitting a PDSCH by a base station (BS) in a wireless communication system. The method may include transmitting a PDCCH for scheduling the PDSCH and receiving the PDSCH in a plurality of TTIs based on the PDCCH. The PDCCH may include rate matching information for the PDSCH, which is equally used in the plurality of TTIs.

Advantageous Effects

According to the present disclosure, a downlink control channel to be repeatedly transmitted in different TTIs may be efficiently scheduled.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

FIG. 6 illustrates resource units used to configure a DL control channel in the LTE system.

FIG. 12 illustrates ACK/NACK channelization for PUCCH formats 1a and 1b.

FIG. 13 illustrates channelization in a structure where PUCCH formats 1/1a/1b and PUCCH formats 2/2a/2b are mixed within the same PRB.

BEST MODE

Figure 1:
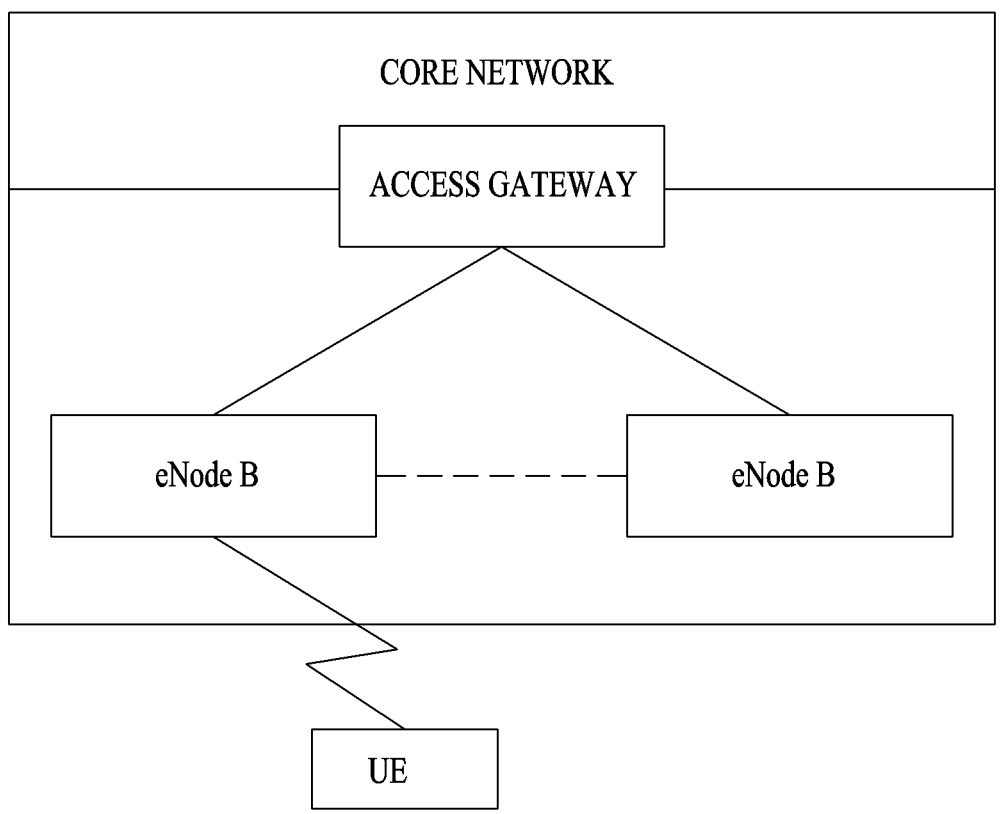
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A Physical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for DL and in Single Carrier Frequency Division Multiple Access (SC-FDMA) for UL.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH)

carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
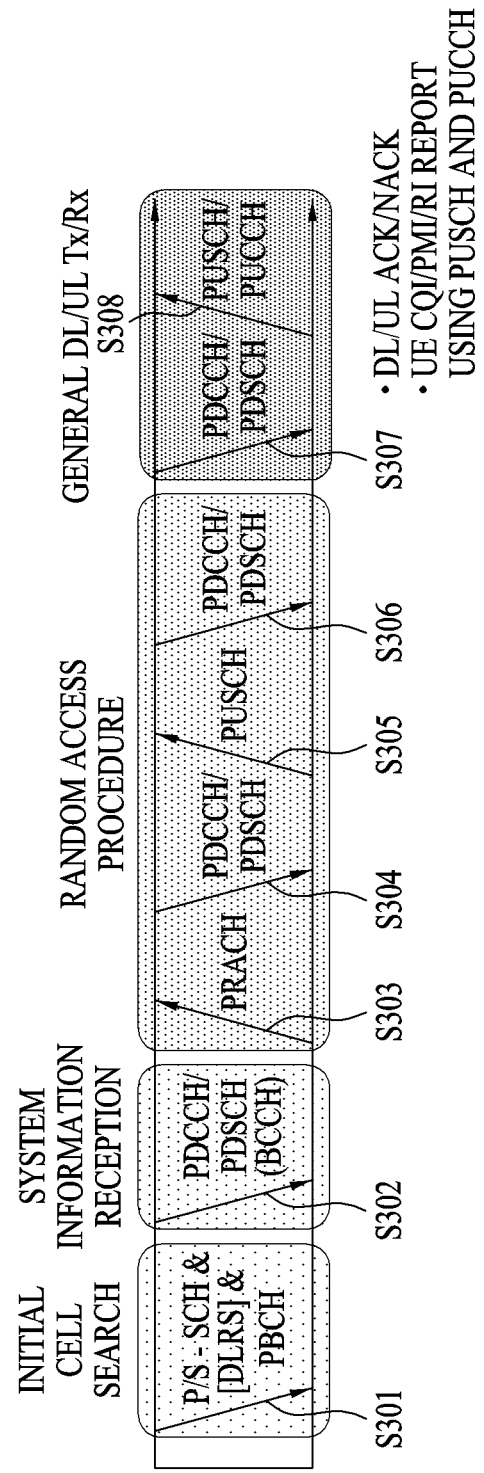
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DL reference signal (RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL Acknowledgment/Negative-acknowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
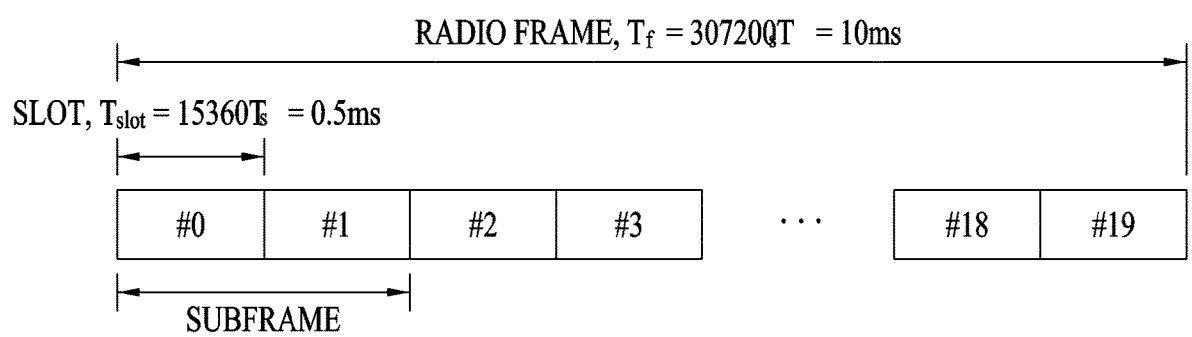
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
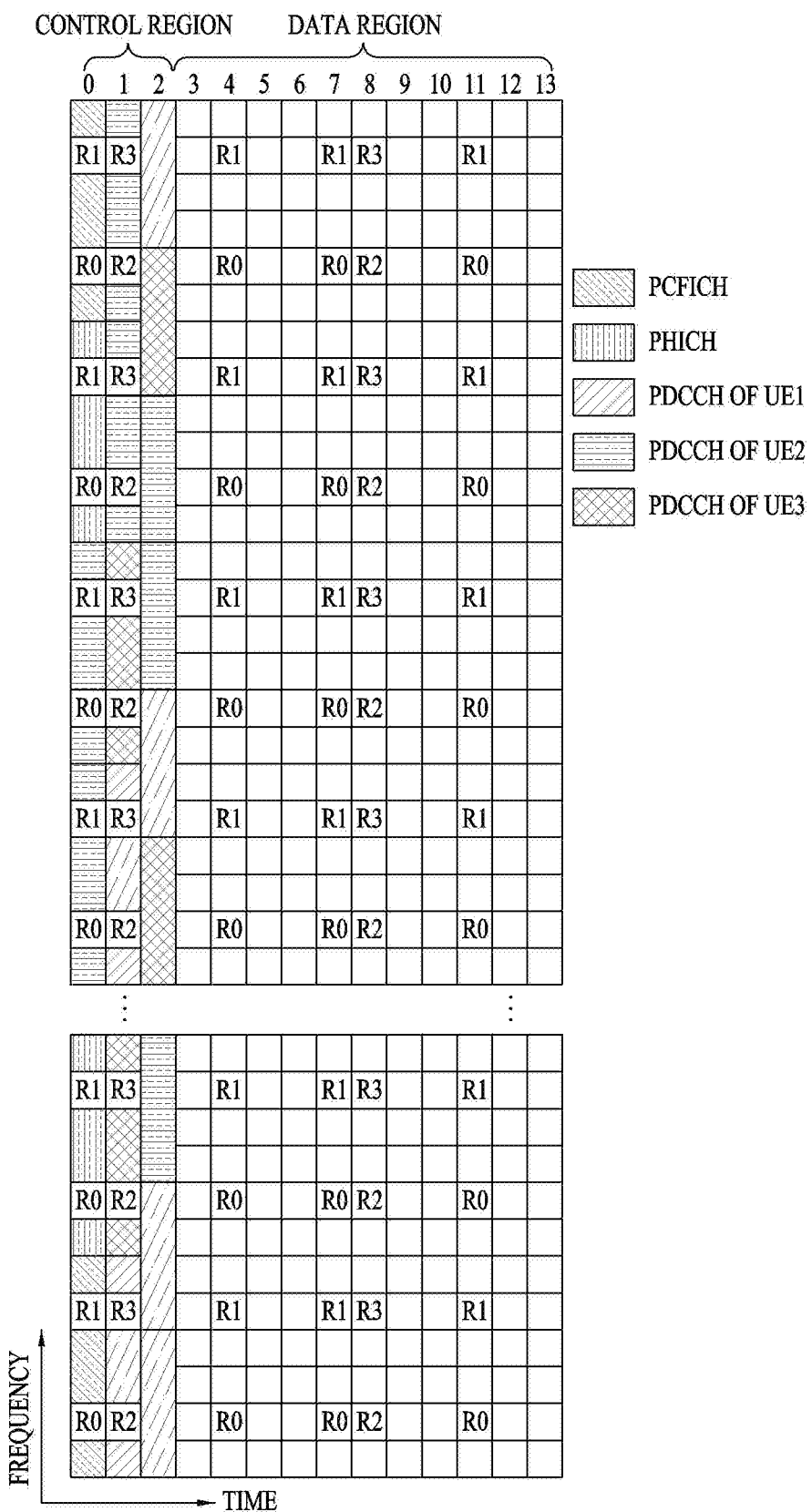
FIG. 5 illustrates a structure of a DL radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying a HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 6 illustrates resource units used to configure a DL control channel in LTE. FIG. 6(a) shows a case in which the number of transmit (Tx) antennas is 1 or 2 and FIG. 6(b) shows a case in which the number of Tx antenna is 4. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 5. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ ($\geq L$) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 7:
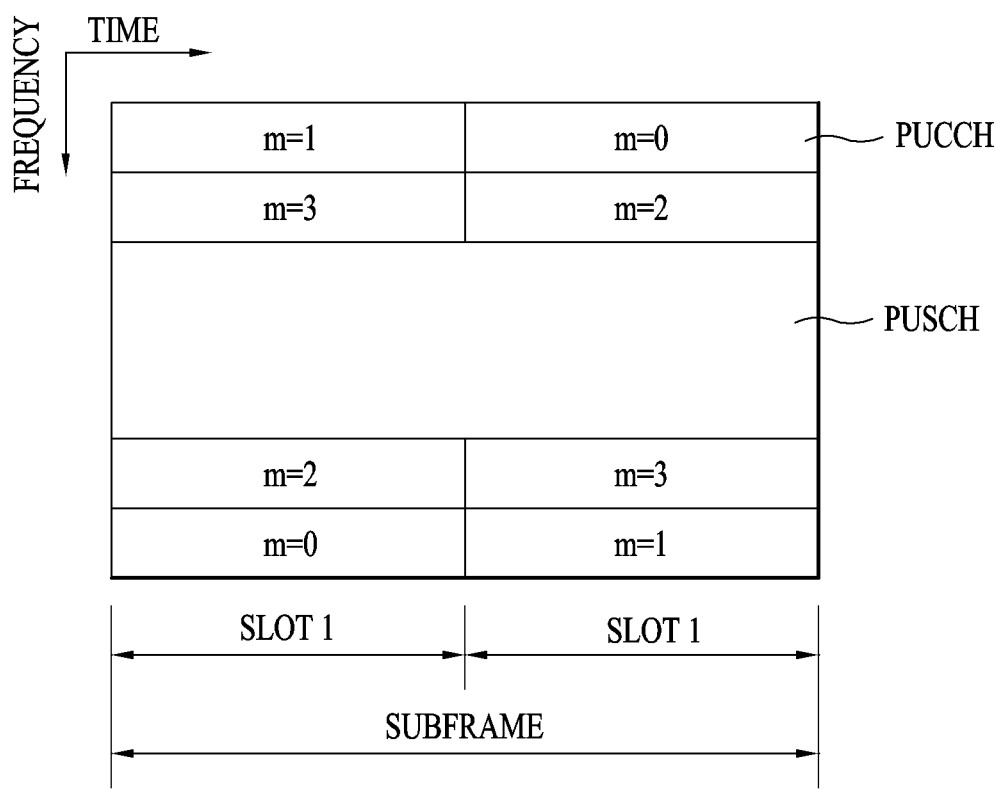
FIG. 7 illustrates a structure of a UL subframe in the LTE system.

FIG. 7 illustrates a structure of a UL subframe in the LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include a HARQ ACK/NACK, a CQI representing a DL channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 7.

FIGS. 8 to 11 illustrate slot level structures of PUCCH formats. The PUCCH has the following formats to transmit control information.

(1) Format 1: used for on-off keying (OOK) modulation and scheduling request (SR)

(2) Formats 1a and 1b: used for ACK/NACK transmission (1) Format 1a: BPSK ACK/NACK for one codeword (2) Format 1b: QPSK ACK/NACK for two codewords (3) Format 2: used for QPSK modulation and CQI transmission (4) Formats 2a and 2b: used for simultaneous transmission of CQI and ACK/NACK Table 2 shows modulation schemes depending on PUCCH formats and the number of bits per subframe. Table 3 shows the number of RSs per slot depending on PUCCH formats. Table 4 shows SC-FDMA symbol locations in an RS depending on PUCCH formats. In Table 2, PUCCH formats 2a and 2b correspond to a normal cyclic prefix (CP).

TABLE 2

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 3

| PUCCH format | Normal CP | Normal CP |
|---|---|---|
| 1, 1a, 1b | 3 | 2 |
| 2 | 2 | 1 |
| 2a, 2b | 2 | N/A |

TABLE 4

| PUCCH format | SC-FDMA symbol locations in RS | |
|---|---|---|
| | Normal CP | Normal CP |
| 1, 1a, 1b | 2, 3, 4 | 2, 3 |
| 2, 2a, 2b | 1, 5 | 3 |

Figure 8:
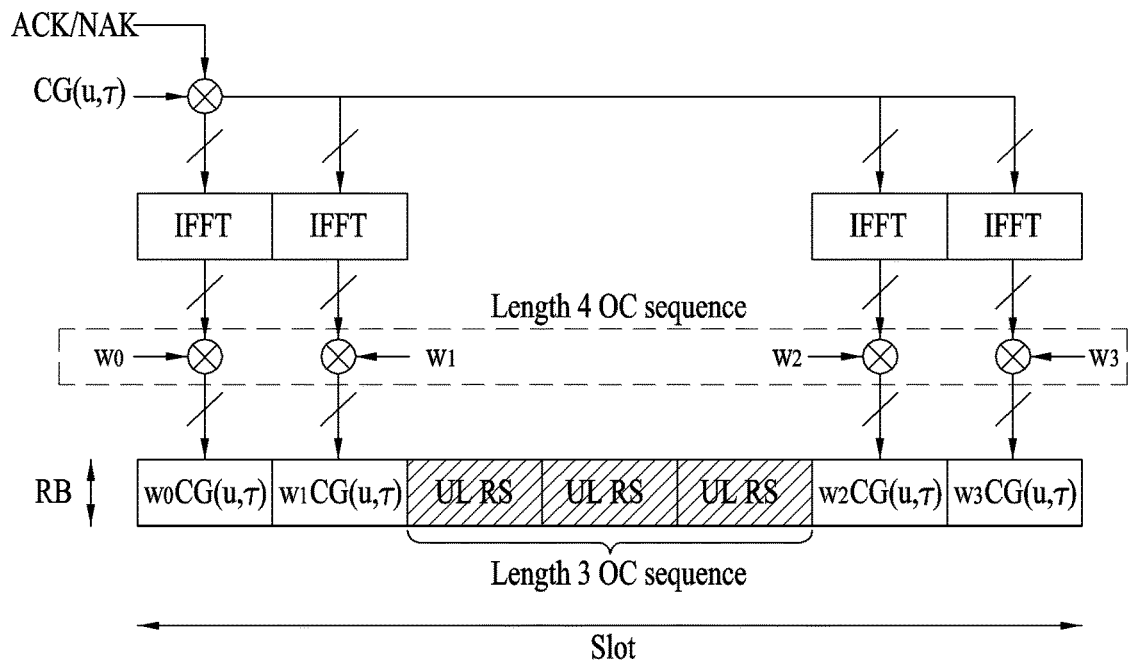
FIGS. 8 and 9 illustrate slot level structures of PUCCH formats 1a and 1b.
Figure 9:
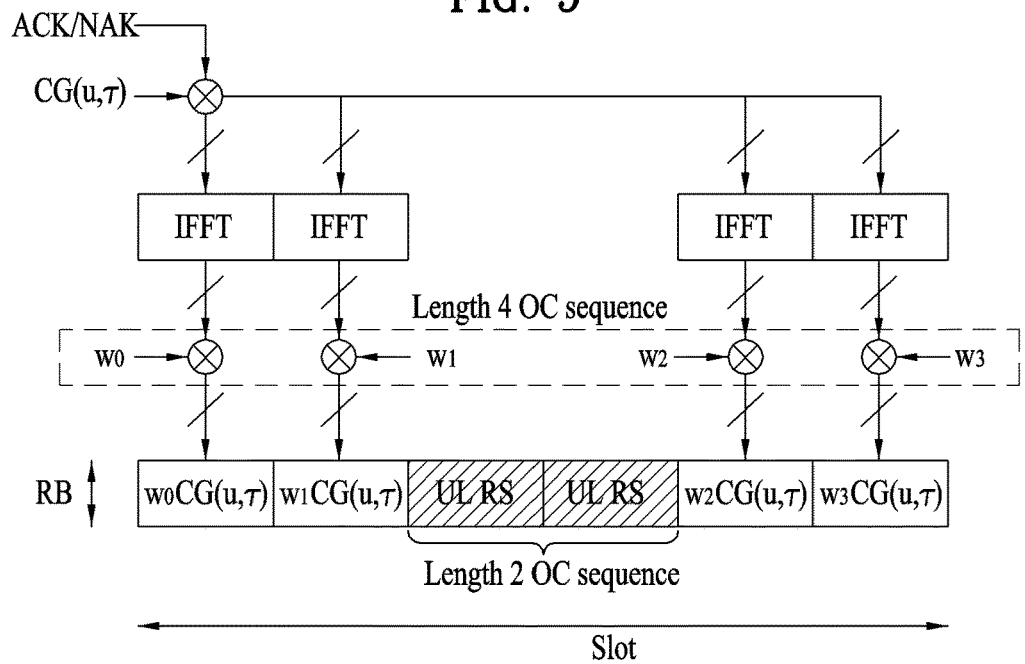

FIG. 8 illustrates a structure of PUCCH formats 1a and 1b in the case of a normal CP. FIG. 9 illustrates a structure of PUCCH formats 1a and 1b in the case of an extended CP. In PUCCH formats 1a and 1b, the same control information is repeated on a slot basis within a subframe. Each UE transmits an ACK/NACK signal on different resources configured with different cyclic shifts (CSs) (frequency-domain codes) of a computer-generated constant amplitude zero auto correlation (CG-CAZAC) sequence and orthogonal covers (OCs) or orthogonal cover codes (OCCs) (time-domain codes). The OC includes, for example, a Walsh/DFT orthogonal code. If the number of CSs is 6 and the number of OCs is 3, a total of 18 UEs may be multiplexed in the same physical resource block (PRB) on the assumption of a single antenna. Orthogonal sequences w0, w1, w2, and w3 may be applied in a certain time domain (after FFT modulation) or in a certain frequency domain (before FFT modulation).

For SR and persistent scheduling, an ACK/NACK resource composed of the CS, OC and PRB may be provided to a UE through radio resource control (RRC). For dynamic ACK/NACK and non-persistent scheduling, the ACK/NACK resource may be implicitly provided to the UE by the lowest CCE index of a PDCCH corresponding to a PDSCH.

Figure 10:
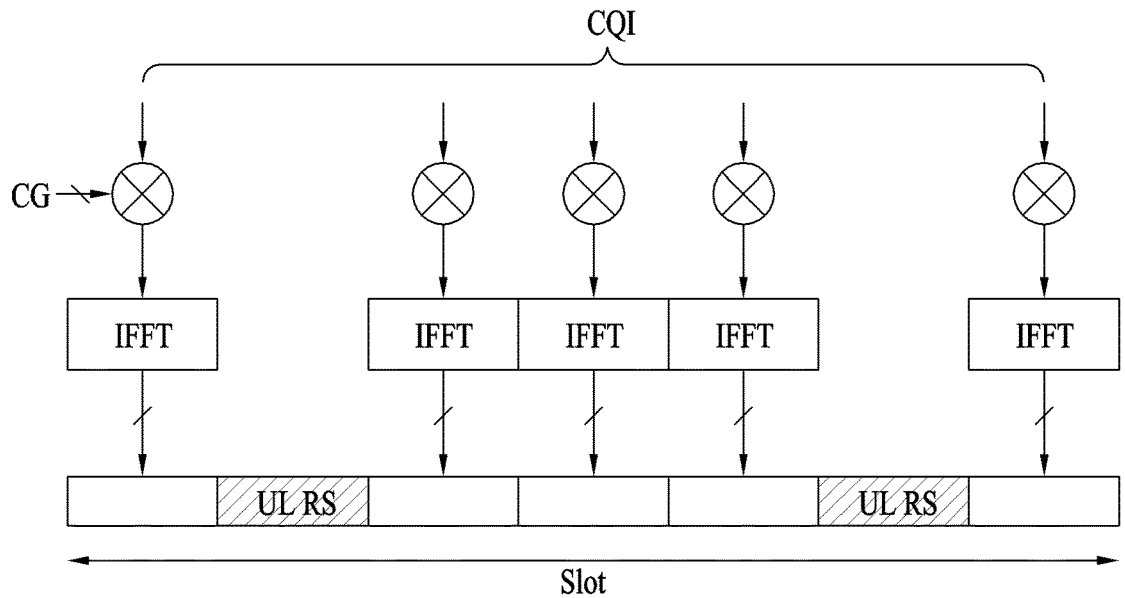
FIGS. 10 and 11 illustrate slot level structures of PUCCH formats 2/2a/2b.
Figure 11:
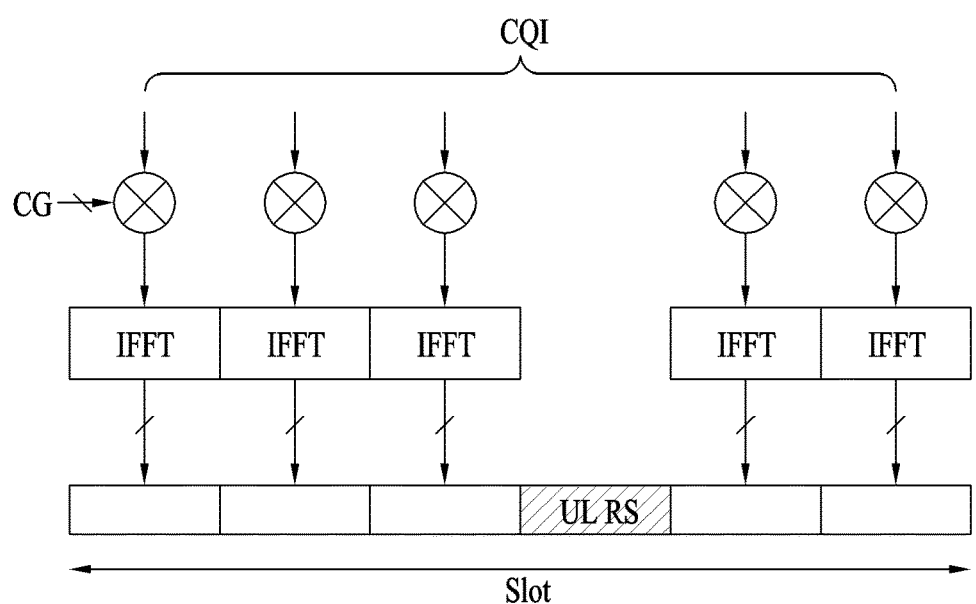

FIG. 10 illustrates a structure of PUCCH formats 2/2a/2b in the case of the normal CP. FIG. 11 illustrates a structure of PUCCH formats 2/2a/2b in the case of the extended CP. Referring to FIGS. 5 and 6, one subframe includes 10 QPSK data symbols in addition to an RS symbol in the normal CP case. Each QPSK symbol spreads in the frequency domain by the CS and is mapped to a corresponding SC-FDMA symbol. SC-FDMA symbol level CS hopping may be applied to randomize inter-cell interference. RSs may be multiplexed, and more particularly, code division multiplexed (CDMed) based on the CS. For example, assuming that the number of available CSs is 12 or 6, 12 or 6 UEs may be multiplexed in the same PRB. That is, in PUCCH formats 1/1a/1b and 2/2a/2b, a plurality of UEs may be multiplexed by CS+OC+PRB and CS+PRB.

Tables 5 and 6 below show length-4 and length-3 orthogonal sequences (OCs) for PUCCH formats 1/1a/1b, respectively.

TABLE 5

Length-4 orthogonal sequences for PUCCH formats 1/1a/1b

| Sequence index $n_{oc}$ $(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 6

Length-3 orthogonal sequences for PUCCH formats 1/1a/1b

| Sequence index $n_{oc}$ $(n_s)$ | Orthogonal sequences $[w(0) \ldots w(N_{SF}^{PUCCH} - 1)]$ |
|---|---|
| 0 | [1 1 1] |
| 1 | $[1 \; e^{j2\pi/3} \; e^{j4\pi/3}]$ |
| 2 | $[1 \; e^{j4\pi/3} \; e^{j2\pi/3}]$ |

Table 7 below shows OCs for an RS in PUCCH formats 1a/1b

TABLE 7

| | 1a and 1b | |
|---|---|---|
| Sequence index $\bar{n}_{oc}$ $(n_s)$ | Normal cyclic prefix | Extended cyclic prefix |
| 0 | [1 1 1] | [1 1] |
| 1 | $[1 \; e^{j2\pi/3} \; e^{j4\pi/3}]$ | [1 −1] |
| 2 | $[1 \; e^{j4\pi/3} \; e^{j2\pi/3}]$ | N/A |

FIG. 12 illustrates ACK/NACK channelization for PUCCH formats 1a and 1b in the case of $\Delta_{shift}^{PUCCH}=2$.

Figure 13:
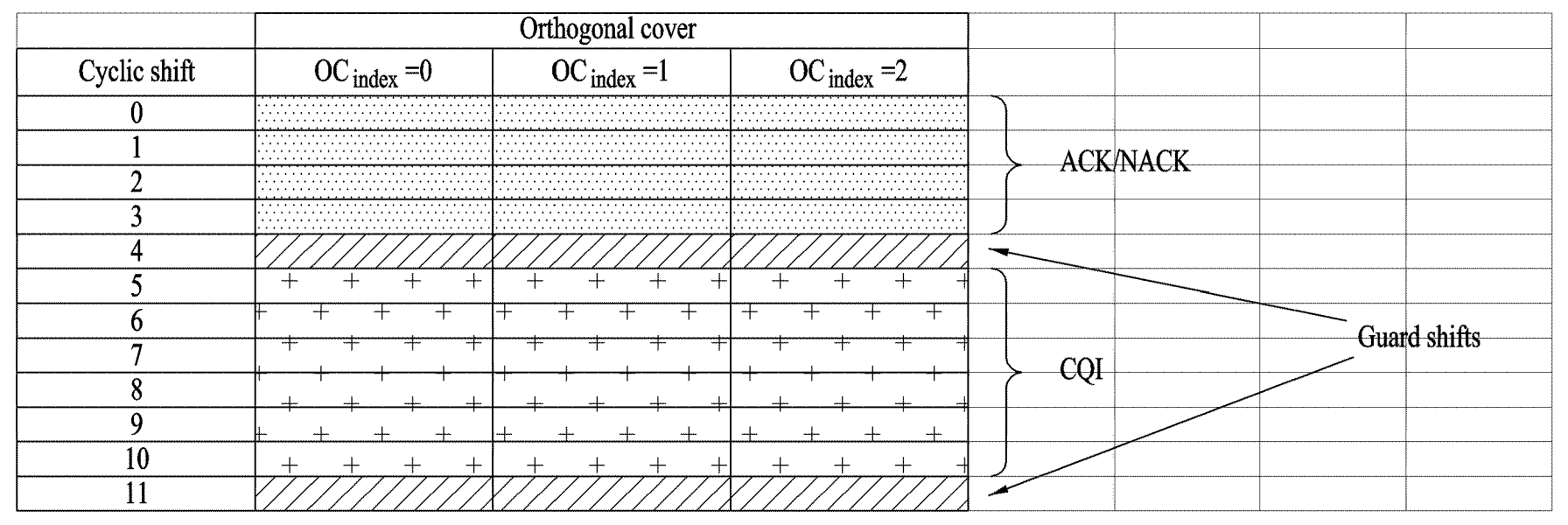

FIG. 13 illustrates channelization in a structure where PUCCH formats 1a/1b and PUCCH formats 2/2a/2b are mixed within the same PRB.

CS hopping and OC remapping may be applied as follows.

(1) Symbol-based cell-specific CS hopping for inter-cell interference randomization (2) Slot level CS/OC remapping (1) For inter-cell interference randomization (2) Slot-based access for mapping between ACK/NACK channel and resource (k)

A resource $n_r$ for PUCCH formats 1a/1b includes the following combination.

(1) CS (=DFT OC at symbol level) ($n_{cs}$)

(2) OC (OC at slot level) ($n_{oc}$)

(3) Frequency RB ($n_{rb}$)

When $n_{cs}$, $n_{oc}$, and $n_{rb}$ denote the indices of the CS, OC, and RB, respectively, a representative index $n_r$ includes $n_{cs}$, $n_{oc}$, and $n_{rb}$. That is, $n_r$ satisfies the relationship of $n_r=(n_{cs}, n_{oc}, n_{rb})$.

The CQI, PMI, RI, and a combination of the CQI and ACK/NACK may be transmitted in PUCCH formats 2/2a/2b. In this case, Reed Muller (RM) channel coding may be applied.

For example, in the LTE system, channel coding for a UL CQI is described as follows. A bit stream $a_0, a_1, a_2, a_3, \ldots, a_{A-1}$ is channel-coded using a (20, A) RM code. Table 8 shows a base sequence for the (20, A) code. Here, $a_0$ and $a_{A-1}$ represent the most significant nit (MSB) and the least significant bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied. Before the QPSK modulation, the encoded bits may be scrambled.

TABLE 8

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated according to Equation 1.

$$b_i = \sum_{n=0}^{A-1} (a_n \cdot M_{i,n}) \bmod 2 \quad \text{[Equation 1]}$$

In Equation 1, i=0, 1, 2, ..., B−1.

Table 9 below shows a UCI field for reporting wideband CQI feedback (single antenna port, transmit diversity, or open-loop spatial multiplexing PDSCH transmission).

TABLE 9

| Field | Bit widths |
|---|---|
| Wideband CQI | 4 |

Table 10 shows a UCI field for wideband CQI and PMI feedback. The field reports closed-loop spatial multiplexing PDSCH transmission.

TABLE 10

| | Bit widths | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 11 shows a UCI field for reporting wideband RI feedback.

TABLE 11

| | Bit widths | | |
|---|---|---|---|
| | | 4 antenna ports | |
| Field | 2 antenna ports | maximum 2 layers | maximum 4 layres |
| RI (Rank Indication) | 1 | 1 | 2 |

Figure 14:
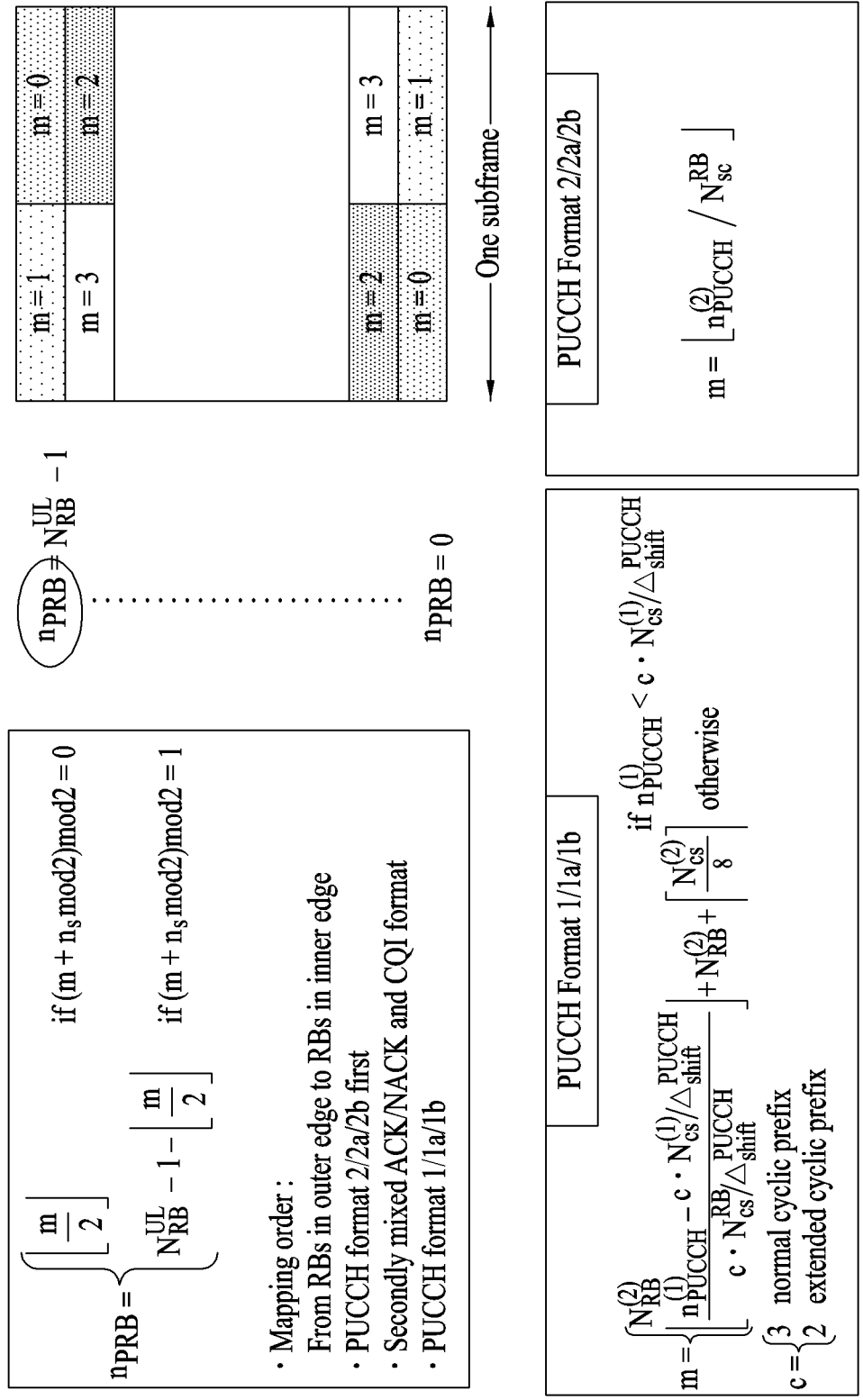
FIG. 14 illustrates PRB allocation for PUCCH transmission.

FIG. 14 illustrates PRB allocation. As shown in FIG. 21, the PRB may be used for PUCCH transmission in a slot ns.

A multi-carrier system or carrier aggregation system refers to a system in which a plurality of carriers with a bandwidth smaller than a target bandwidth are aggregated for wideband support. When the plurality of carriers with the bandwidth smaller than the target bandwidth are aggregated, the bandwidth of the aggregated carriers may be limited to a bandwidth used in the legacy system for backward compatibility with the corresponding system. For example, the legacy LTE system may support bandwidths of 1.4, 3, 5, 10, 15 and 20 MHz, and the LTE-Advanced (LTE-A) system evolved from the LTE system may support a bandwidth greater than 20 MHz using only the bandwidths supported in the LTE system. Alternatively, a new bandwidth may be defined to support carrier aggregation, regardless of bandwidths used in the legacy system. The term "multi-carrier" may be used interchangeably with the terms "carrier aggregation" and "bandwidth aggregation". The term "carrier aggregation" may refer to both contiguous carrier aggregation and non-contiguous carrier aggregation.

Hereinafter, a description will be given of a method of transmitting and receiving a DL data channel according to embodiments of the present disclosure.

In next-generation communication systems, various methods are considered to achieve ultra-low latency and ultra-high reliability in transmitting and receiving information. To this end, various target quality of service (QoS) requirements, that is, various latency and/or reliability requirements are configured, and a different operation is performed for each QoS requirement, thereby efficiently providing services related to the corresponding target QoS requirements.

The present disclosure proposes a method of configuring a DL control channel in a communication system designed for latency reduction and reliability improvement. Details and/or embodiments of the present disclosure may be considered as a proposed method, and a combination thereof may also be considered as a proposed method. In addition, it is apparent that the present disclosure is not limited to the embodiments or specific systems.

To improve the reliability of control information transmitted in DL in a communication system, channel coding may be applied to the DCI. In this case, many resources such as frequency, time, and/or spatial resources may be used in transmitting the DCI to reduce a code rate.

When it is said that many time resources are used, DCI may be transmitted in multiple TTIs. In this case, the same DCI may be repeated in multiple TTIs, and DCIs received in the multiple TTIs may be combined and then decoded.

In this case, a PDCCH candidate pair to be combined may be configured. In other words, when a control RB set is configured by higher layer signaling, the control RB set may be maintained during several tens of ms. If combining is performed between the same PDCCH candidate indices in each TTI, the locations of the corresponding PDCCH candidates may be fixed.

Thus, to obtain the diversity effect, multiple PDCCH candidates to be combined may change for each TTI. At least one specific pattern for indicating multiple PDCCH candidates in each TTI may be predefined in the system, and a BS may inform a UE of the at least one specific pattern through higher layer signaling and/or physical layer signaling. In addition, it may be considered that after determining an offset, the offset is applied to some repeated DCIs. The above operation may be equally applied when data is repeated.

In other words, for DCI combining, since the same DCI needs to be transmitted in multiple TTIs, data resource allocation and/or redundancy version (RV) thereof may be fixed and then transmitted in multiple DCIs. When data scheduled by DCI is repeated, the transmission resource and/or RV thereof may change according to a specific pattern or an offset may be applied to some data while the transmission resource and/or RV is fixed, thereby obtaining diversity gain.

When DCI is repeated, the BS may provide the number of repetitions through higher layer signaling and/or physical layer signaling. If the repetition starting point is not fixed, the UE may miss the DCI. Thus, the BS needs to inform how many repetitions are performed before the UE receives the DCI.

To this end, a value obtained by performing the following operation: (index of TTI in which repetition starts) modulo (repetition number) may be included in DCI. If each DCI contains information on how many repetitions are performed before the corresponding DCI, each DCI may include a different number of bits. However, according to this method, all DCIs may have the same bits, and the repetition order of each DCI may be provided. Thus, the method is advantageous in that repeated DCIs are easily combined.

Further, how many repetitions are performed before corresponding DCI may be informed by the RV value of data scheduled by each DCI repeated in multiple TTIs. To this end, when the number of DCI repetitions is configured, the RV values of data scheduled by DCIs may be predefined by a specific pattern. For example, when the number of DCI repetitions is set to 4 and it is predefined that the RV values of DCIs are set to 0, 2, 3, and 1, respectively, if the UE succeeds in DCI decoding and corresponding DCI includes RV 1, the UE may implicitly know that the corresponding DCI is the fourth repeated DCI.

It may be also considered that instead of combining DCIs repeatedly transmitted in multiple TTIs, a UE decodes the DCIs separately. In this case, data respectively scheduled by the DCIs repeatedly transmitted in the multiple TTIs may be for the same transport block (TB). In the case of DL assignment DCI, various PDSCH scheduling and HARQ-ACK transmission methods may be considered based on the number of times that a control channel is repeated and the number of times that a data channel is repeated.

Figure 15:
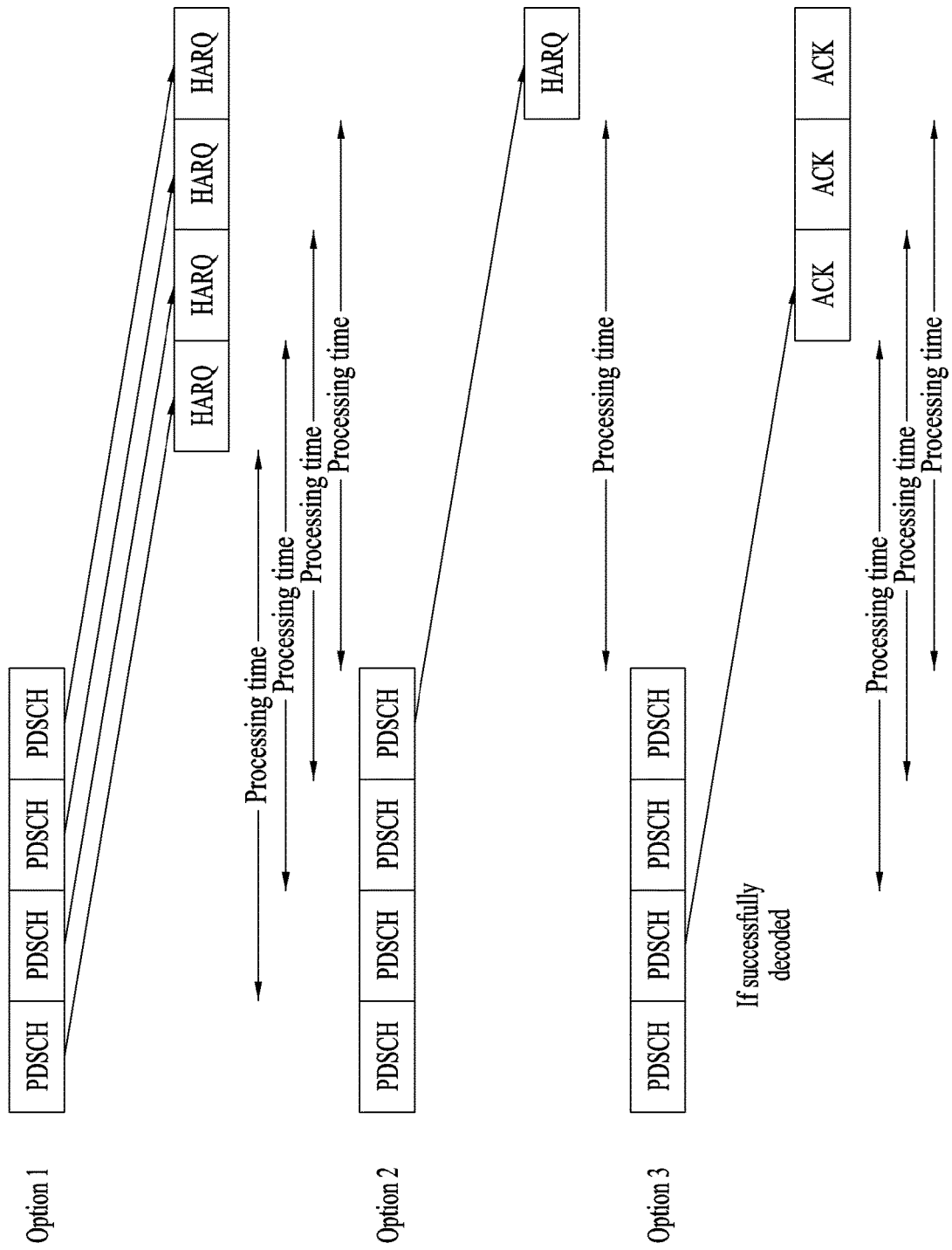
FIG. 15 is a diagram for explaining a HARQ transmission method for a repeatedly transmitted PDSCH according to embodiments of the present disclosure.

For example, when the number of repetitions of a control channel is equal to that of a data channel, HARQ-ACK may be transmitted whenever data is received as shown in Option 1 of FIG. 15. Alternatively, as shown in Option 2 of FIG. 15, the HARQ-ACK may be transmitted only after decoding is performed as many times as a predetermined number of data repetitions. Option 2 of FIG. 15 is advantageous in that a UE may reduce it power consumption by reducing the number of times of HARQ-ACK transmission.

Meanwhile, as shown in Option 3 of FIG. 15, a UE may transmit an ACK when successfully decoding data and transmit a NACK when failing in decoding as many times as a predetermined number of data repetitions. In this case, if the UE successfully decodes the data within the number of data repetitions (i.e., while the data transmission is still repeated), the UE may no longer attempt to decode the data after the corresponding time. Thus, in Option 3 of FIG. 15, a BS may expect that the ACK and NACK for the corresponding data repetition may be received at different times. For example, the BS may expect to receive a NACK for the last repeated data and ACKs for the first to second last repeated data. Upon receiving an ACK, the BS may recognize that the UE fails in decoding other data repeatedly transmitted before the data corresponding to the ACK. That is, the BS may recognize that the data repeatedly transmitted before the data corresponding to the ACK corresponds to an NACK.

In Option 3 of FIG. 15, a UE reduces its power consumption. Further, Option 3 of FIG. 15 is advantageous in that latency is reduced, compared to Option 2 of FIG. 15 where HARQ-ACK transmission is attempted after decoding is performed as many times as the number of data repetitions.

When the number of repetitions of a data channel is more than that of a control channel, HARQ-ACK transmission may be performed after data channels related to one control channel are completely received. When the data channels related to the one control channel are repeated, resource allocation (RA) may be fixed or vary according to a predetermined pattern or a specific offset. For example, control information may be repeatedly transmitted at a certain time in the frequency domain, and data (or a data channel) may be repeatedly transmitted in multiple TTIs.

When the number of repetitions of a control channel is more than that of a data channel, similar operation to LTE MTC may be considered. However, in this case, since DCIs are not combined, a UE does not need to know resources for transmitting DCI, unlike the MTC.

For example, when repetition is performed in total four TTIs, DCI may be repeatedly transmitted in all TTIs, and a data channel may be repeatedly transmitted in the last two TTIs. If the number of repetitions is indicated, it may be implicitly assumed that the data channel is repeated by counting the number of repetitions thereof from the last transmission of the control channel.

When HARQ-ACK transmission is repeated, the HARQ-ACK may be repeatedly transmitted as many times as a predetermined repetition number starting from the above HARQ-ACK transmission time, or the HARQ-ACK may be repeatedly transmitted until a predetermined timing. In addition, when the HARQ-ACK is configured to be repeatedly transmitted until the predetermined timing, the number of HARQ-ACK repetitions may vary depending on when data is successfully decoded. Alternatively, the number of HARQ-ACK repetitions may vary depending on whether the HARQ-ACK is an ACK or a NACK.

A UE may be configured with the number of HARQ-ACK repetitions in advance. In this case, a new HARQ-ACK may be transmitted during the HARQ-ACK repetition. The UE may stop repeating the previous HARQ-ACK and start to repeat the new HARQ-ACK. The above HARQ-ACK repetition method may increase the number of HARQ-ACK repetitions.

To prevent an excessive increase in the number of HARQ-ACK repetitions, the following operation may be applied when the HARQ-ACK repetition is performed for the same TBs.

(1) When the same HARQ-ACK state is maintained

Instead of performing the new HARQ-ACK repetition, the UE continues to perform the previous HARQ-ACK repetition.

(2) When at least one the HARQ-ACK state changes

Instead of performing the previous HARQ-ACK repetition, the UE performs the new HARQ-ACK repetition. In this case, resources may be configured such that different resources are allocated to the previous HARQ-ACK and the new HARQ-ACK. Alternatively, resources may be configured according to a predetermined rule. For example, resources may be allocated by increasing the CS value by 1. Alternatively, ACK/NACK frequency resources may be predetermined, or at least one thereof may be selected.

The above operation may depend on HARQ-ACK states. When the HARQ-ACK state switches from the ACK state to the NACK state, the UE may continue to perform the previous HARQ-ACK repetition by dropping the new HARQ-ACK repetition. When the HARQ-ACK state switches from the NACK state to the ACK state, the UE may perform the new HARQ-ACK repetition by stopping the previous HARQ-ACK repetition.

(3) When the HARQ-ACK state changes

The HARQ-ACK repetition for a PDSCH that requires high QoS such as a URLLC PDSCH is prioritized. When a HARQ-ACK to be transmitted later includes only the HARQ-ACK for eMBB, the HARQ-ACK to be transmitted later may not be repeated. Specifically, a HARQ-ACK including NACK bits for the URLLC PDSCH may be preferentially repeated.

In the case of UL grant DCI, the same TB may be scheduled based on DCIs repeatedly transmitted in multiple TTIs. In this case, each of the DCIs transmitted at different times may include information on the timing of a PUSCH scheduled by the corresponding DCI. If the PUSCH is also repeatedly transmitted, the information on the timing of the PUSCH may indicate the starting point of the PUSCH repetition.

Basically, the UE does not expect that one PUSCH is scheduled by DCIs transmitted at different times. However, when DCI repetition operation is configured and when repeated DCIs schedule one TB, the UE may expect that one PUSCH is scheduled by DCIs transmitted at different times. When it is said that repeated DCIs schedules one TB, it may mean that all the repeated DCIs indicate the same HARQ process ID and NDI value and PUSCH timing information indicates the same time.

For example, when the DCI repetition operation is configured, when PUSCH timing information included in DCIs transmitted in TTIs n, n+1, n+2, and n+3 indicate times after 7, 6, 5, and 4 TTIs from the times when the DCIs are transmitted, respectively, and when each DCI includes the same HARQ process ID and NDI, the corresponding DCIs may commonly schedule a PUSCH to be transmitted at a time n+7.

If the PUSCH repetition is also configured, the PUSCH may be repeated by a predetermined number of times from the time n+7. Here, PUSCH timing information may be defined as the number of TTIs from the index of a TTI in which DCI is transmitted to a location in which a PUSCH is transmitted. Index information corresponding to the number of TTIs may also be transmitted. Further, to implicitly inform the PUSCH timing information, index information indicating how many repetitions are performed before the corresponding DCI may be provided.

In the above example, the DCI transmitted in the TTI n may include information indicating that the DCI corresponds to the first repetition, and the DCI transmitted in the TTI n+1 may include information indicating that the DCI corresponds to the second repetition. The corresponding information may be implicitly mapped to information indicating that the PUSCH will be transmitted at the times after 7 and 6 TTIs from the times when the corresponding DCIs are transmitted. The mapping relationship may vary depending on the repetition number. Further, the mapping relationship may be predefined in the system or provided by a BS to a UE through higher layer signaling and/or physical layer signaling.

When the DCI repetition is performed, a TTI in which the repetition starts and/or a period thereof may be preconfigured. The corresponding TTI and/or period may be implicitly determined by association with the repetition number or explicitly configured. For example, the UE may be configured or determined to start the repetition at the TTI index satisfying the condition of (TTI index) modulo (repetition number)=0. In this case, the UE may know how many DCIs are repeated before corresponding DCI based on a value of (index of TTI in which successfully decoded DCI is transmitted) modulo (predetermined repetition number or repetition period). In other words, information indicating how many DCIs are repeated before the corresponding DCI may be implicitly mapped to information indicating how many TTIs are present between a TTI in which a PUSCH scheduled by the corresponding DCI is transmitted and a TTI in which the corresponding DCI is transmitted.

As described above, the present disclosure is not limited to the above-described embodiments. That is, the details of the DL assignment and UL grant are applicable to the UL grant and DL assignment, respectively. For example, DCIs at different times may schedule a PDSCH at one same time. More specifically, DCIs transmitted in TTIs n and n+1 may schedule a PDSCH at a time n+2. In this case, the PDSCH may be repeated. Information about the starting point of PDSCH transmission and the number of PDSCH repetitions may be included in DCI scheduling the repetition of the corresponding PDSCH.

It is assumed that when PDCCHs and PDSCHs are transmitted at times n, n+1 and n+2, the PDCCH at the time n schedules the PDSCHs at the times n, n+1 and n+2, the PDCCH at the time n+1 schedules the PDSCHs at the times n+1 and n+2, and the PDCCH at the time n+2 schedules the PDSCH at the time n+2. If decoding of the PDCCH at the time n fails, the PDSCH at the time n may not be received.

However, when PDCCHs (DCIs) and PDSCHs are transmitted at different times as described in the above example, all PDSCHs may be received if decoding of any one of the DCIs transmitted in TTIs n and n+1 succeeds.

When the PDCCH and PDSCH are transmitted in different TTIs, more resources in a corresponding TTI may be used for the PDSCH, compared to when the PDCCH and PDSCH are transmitted together in each TTI. Thus, in this case, latency may be reduced since the number of PDSCH repetitions may decrease. This method may be suitable when the TTI has a short length, for example, ⅔ symbols. In addition, when the PDCCH and PDSCH are transmitted in different TTIs, the number of PDCCH repetitions may be configured independently of the number of PDSCH repetitions. Specifically, the number of PDCCH repetitions may be equal to or different from the number of PDSCH repetitions.

When PUSCH transmission is repeated, information about how many repetitions are performed before a corresponding PUSCH and/or information about which point the corresponding PUSCH transmission starts at may be provided by tagging in the PUSCH. The point where the PUSCH repetition starts may be preconfigured. Such a configuration may be predefined in the system or provided by a BS to a UE through higher layer signaling and/or physical layer signaling.

The above-described method may be applied when a UL grant is repeatedly transmitted and the transmission timing of a PUSCH corresponding to each UL grant is fixed. According to this method, a BS may reduce the number of times that a UE performs blind decoding for PUSCH transmission.

The present disclosure is not limited to the above-described embodiments. Specifically, the details of the UL and DL transmission are applicable to the DL and UL transmission, respectively. That is, the details of the PUSCH and PDSCH may be applied to the PDSCH and PUSCH, respectively. In addition, the TTI described herein is not limited to a specific length of TTI, and it may refer to various TTIs including a sTTI, etc.

Meanwhile, a time resource where repetition starts such as a sTTI or a symbol and the number of data repetitions scheduled in each sTTI may be preconfigured. The numbers of repetitions of control and data channels may be configured semi-statically.

When a PDCCH and a PDSCH are scheduled, each of the channels may be repeated. In this case, rate matching may be performed for the repeated PDSCH, and information thereon may be transmitted on the PDCCH. Hereinafter, how a BS and a UE operates will be described with reference to FIGS. 16 to 18.

Figure 16:
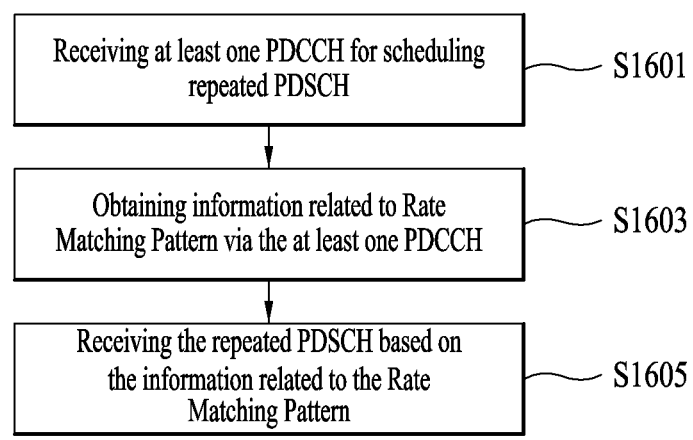
FIGS. 16 to 18 are flowcharts for explaining UE and BS operations related to rate matching for a repeatedly transmitted PDSCH.

With reference to FIG. 16, a description will be given of how the UE performs the rate matching for the repeated PDSCH. The UE may receive at least one PDCCH for scheduling the repeated PDSCH (S1601) and obtain information related to a rate matching pattern from the received at least one PDCCH (S1603). In this case, the PDCCH for scheduling the repeated PDSCH may be transmitted once or repeatedly.

The UE may receive the repeated PDSCH based on the obtained information related to the rate matching pattern (S1605). In this case, how the rate matching pattern is applied to the repeated PDSCH may be determined according to Embodiments 1-1 to 1-4 and/or Embodiments 2-1 to 2-3, which will be described later.

Figure 17:
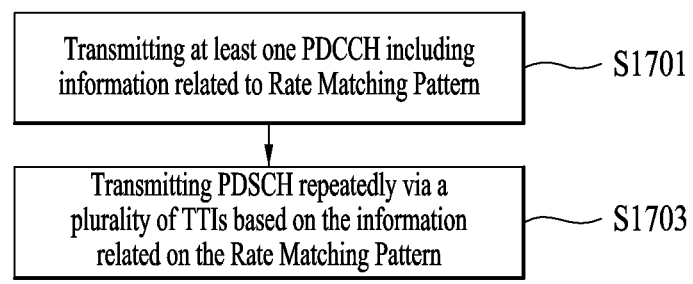

With reference to FIG. 17, a description will be given of how the BS operates in response to the UE operation. The BS may transmit the rate matching pattern information for the repeated PDSCH over the at least one PDCCH for scheduling the repeated PDSCH (S1701). The BS may repeatedly transmit the PDSCH in a plurality of TTIs based on the rate matching pattern information (S1703). In this case, the PDCCH for scheduling the repeated PDSCH may be transmitted once or repeatedly. In this case, how the rate matching pattern is applied to the repeated PDSCH may be determined according to Embodiments 1-1 to 1-4 and/or Embodiments 2-1 to 2-3, which will be described later.

Figure 18:
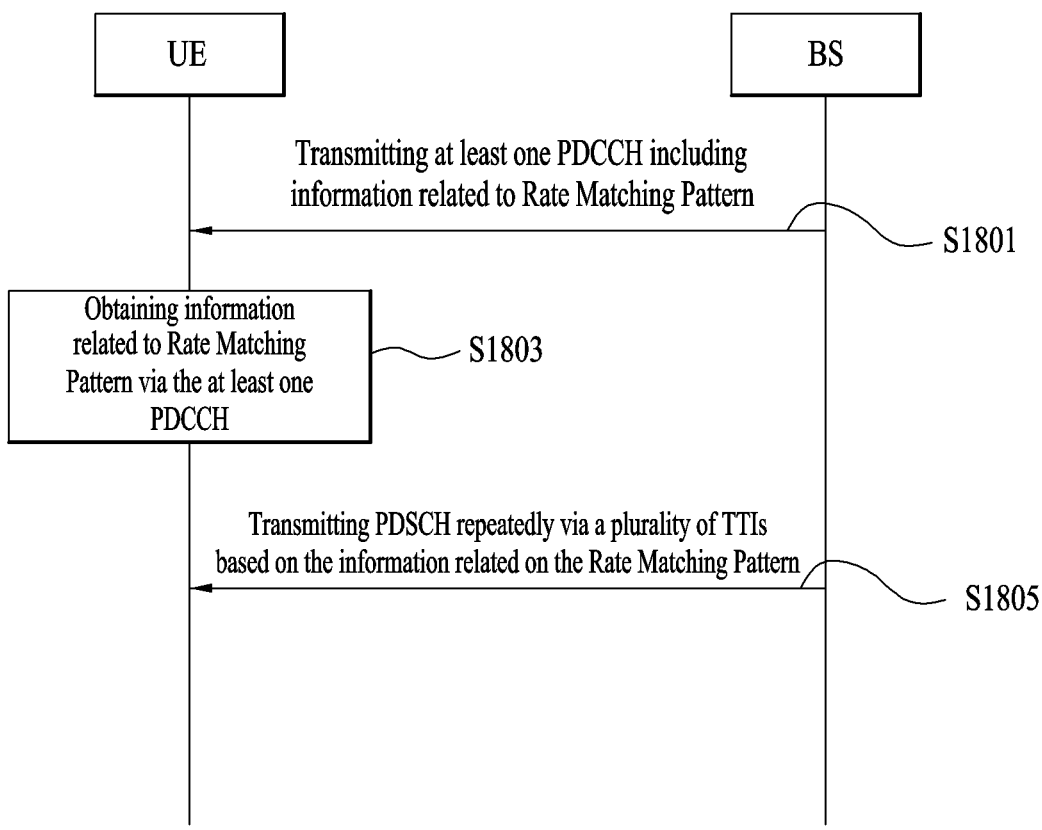

With reference to FIG. 18, a description will be given of how the network operates regarding the UE and BS operations.

The BS may transmit the rate matching pattern information for the repeated PDSCH over the at least one PDCCH for scheduling the repeated PDSCH (S1801), and the UE may obtain the rate matching pattern information from the at least one PDCCH (S1803). The BS may repeatedly transmit the PDSCH in the plurality of TTIs based on the rate matching pattern information, and the UE may repeatedly receive the PDSCH in the plurality of TTIs based on the rate matching pattern information (S1805). In this case, the PDCCH for scheduling the repeated PDSCH may be transmitted once or repeatedly. In this case, how the rate matching pattern is applied to the repeated PDSCH may be determined according to Embodiments 1-1 to 1-4 and/or Embodiments 2-1 to 2-3, which will be described later.

Hereinafter, Embodiments 1-1 to 1-4 and/or Embodiments 2-1 to 2-3, which are related to the rate matching described in FIGS. 16 to 18, will be described with reference to FIG. 19.

In this case, Embodiments 1-1 to 1-4 and/or Embodiments 2-1 to 2-3 may be combined together for implementation thereof. Any one of Embodiments 1-1 to 1-4 may be combined with any one of Embodiments 2-1 to 2-3. For example, the rate matching pattern may be indicated according Embodiment 1-1, and the rate matching and PDSCH decoding based thereon may be performed according to Embodiment 2-1.

Embodiment 1: Application of Rate Matching Pattern Indicated by PDCCH (1) Embodiment 1-1: It is assumed that the same rate matching pattern is applied to all repeated PDSCHs.

Figure 19:
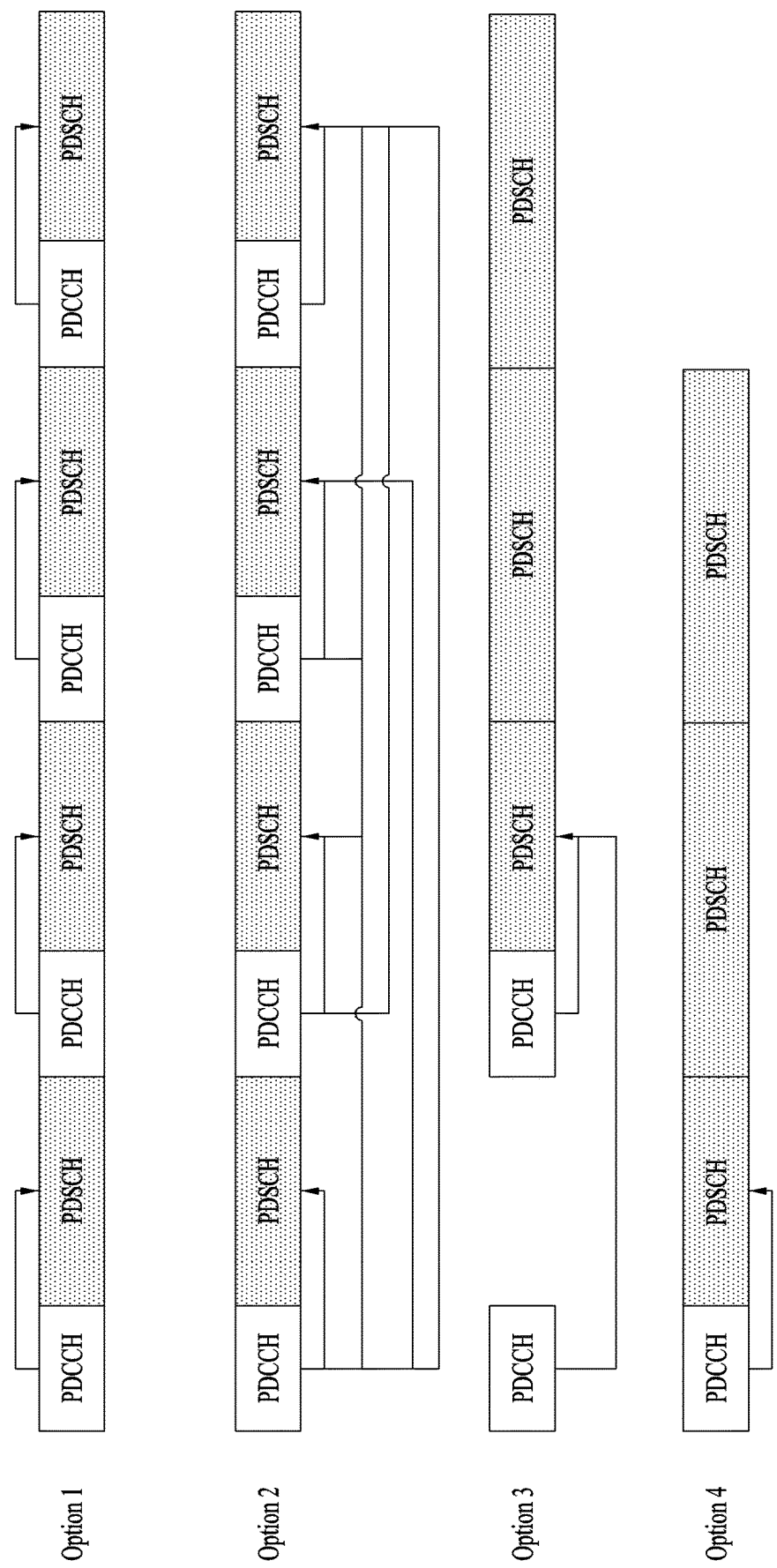
FIG. 19 is a diagram for explaining a rate matching method for a repeatedly transmitted PDSCH according to embodiments of the present disclosure.

When a single PDCCH schedules a plurality of repeated PDSCHs as shown in Option 4 of FIG. 19, rate matching information included in DCI transmitted on the corresponding PDCCH may be applied to all the repeated PDSCHs for the operation of Embodiment 1-1.

When a PDCCH is also repeated as shown in Options 1 and 2 of FIG. 19, the same rate matching pattern information may be included and transmitted in DCI transmitted on each PDCCH for the operation of Embodiment 1-1.

When a PDCCH is repeatedly transmitted and then a PDSCH is repeatedly transmitted as shown in Option 3 of FIG. 19, the same rate matching pattern information may be included and transmitted in DCI transmitted on each PDCCH, or rate matching information included in the last transmitted DCI may be applied to the repeated PDSCHs.

When it is said that the same rate matching information is applied to all repeated PDSCHs, it may mean that in TTIs where a PDSCH is repeated after a TTI where DCI is transmitted, resources located at the same positions as resources not used for PDSCH mapping in the TTI where the DCI is transmitted are not equally used for the PDSCH mapping in the TTIs where the PDSCH is repeated after the TTI where the DCI is transmitted.

(2) Embodiment 1-2: A corresponding rate matching pattern is applied only to a PDSCH transmitted in the same sTTI/TTI as a corresponding PDCCH.

For example, in Option 2 of FIG. 18, one PDCCH may include scheduling information on PDSCHs included in multiple sTTIs/TTIs. In this case, rate matching pattern information included in DCI transmitted on the corresponding PDCCH may be applied only to a PDSCH in a sTTI/TTI where the corresponding DCI is transmitted.

(3) Embodiment 1-3: A PDCCH may include all rate matching patterns to be applied while a PDSCH is repeated. In this case, information on all rate matching patterns for different sTTIs/TTIs may be included and transmitted in DCI transmitted on each PDCCH. In other words, information on rate matching patterns applied to not only a sTTI/TTI where corresponding DCI is transmitted but also sTTIs/TTIs thereafter may be included and transmitted therein.

(4) Embodiment 1-4: Which one of Embodiments 1-1 to 1-3 is applied may be determined by a network configuration. In this case, at least one embodiment may be configured. That is, multiple embodiments among Embodiments 1-1 to 1-3 may be applied depending on situations.

Embodiment 2: Rate Matching for PDCCH Including Scheduled DCI (1) Embodiment 2-1

It is assumed that a UE assumes that a PDCCH is transmitted in a next sTTI using the same resources as those for the PDCCH detected while a PDSCH is repeated and then performs rate matching using (or based on) the same resources as those for the PDCCH scheduling PDSCH mapping in a next PDSCH repetition.

In other words, it may be assumed that in TTIs after a TTI in which a PDCCH is detected, repeated PDSCHs are not mapped to resources where the PDCCH is mapped. Here, the TTIs after the TTI where the PDCCH is detected may refer to TTIs where a PDSCH is repeated after the TTI where the PDCCH is detected.

When the number of PDCCH repetitions is different from that of PDSCH repetitions, an ambiguity problem may be solved, but rate matching may be performed more times than necessary. When the UE is dynamically or statically configured with the number of PDCCH repetitions, the UE may perform PDSCH rate matching as many times as the number of PDCCH repetitions. However, for Embodiment 2-1, it needs to be assumed that DCI scheduling the same TB is transmitted on the same PDCCH resources in multiple TTIs.

(2) Embodiment 2-2

It is assumed that a UE performs rate matching only in a sTTI/TTI where a PDCCH is detected. In this case, if the PDCCH is repeated and PDSCHs are repeated while overlapping with each other, there may be an ambiguity in the rate matching.

(3) Embodiment 2-3

It is assumed that a UE does not perform rate matching for a detected PDCCH when a PDSCH is repeated. That is, this may mean that the PDSCH and PDCCH are configured not to overlap with each other by network scheduling or the rate matching is not performed. If the PDCCH scheduling the PDSCH overlaps with the PDSCH, it may be assumed that the PDCCH punctures the PDSCH.

The number of PDSCH/PDCCH repetitions may be included in DCI. Alternatively, only the number of PDCCH repetitions may be provided by the DCI, and the number of PDSCH repetitions may be statically configured.

The ratio of the number of PDCCH repetitions to the number of PDSCH repetitions may be predetermined. For example, if the ratio of the number of PDCCH repetitions to the number of PDSCH repetitions is 1:1, a UE may assume that the PDCCH is repeated as many times as the number of PDSCH repetitions. Meanwhile, the UE may use such information for control channel validation and rate matching. If the ratio of the number of PDCCH repetitions to the number of PDSCH repetitions is not 1:1, it may be assumed that the PDCCH repetition is performed on consecutive sTTIs/TTIs or consecutive valid resources.

In addition to the above-described embodiments, it may be considered that DCI is transmitted using many frequency resources. For example, a method of transmitting DCI by configuring a high aggregation level (AL) may be considered.

Specifically, it may be considered that a high (or higher) AL is configured by aggregating multiple PDSCCH candidates for a low (or lower) AL, which are included in the same control RB set or different control RB sets. In this case, encoded bits may be divided and transmitted such that the divided encoded bits are suitable for the size of each aggregation PDCCH candidate (i.e., each PDCCH candidate to be aggregated). In addition, by considering the characteristics of a control RB set to which each PDCCH candidate belongs, systematic bits among the encoded bits are included in a PDCCH candidate in a control RB set with a more robust structure such as a distributed structure and/or a CRS-based RB set.

In other words, a BS may configure DCI such that systematic bits are included in a PDCCH candidate in a control RB set with a high priority, and in this case, such priorities may be informed by the BS to a UE through higher layer signaling and/or physical layer signaling.

Meanwhile, encoded bits may be interleaved, and then interleaved bits may be distributed and transmitted based on the size of each aggregation PDCCH candidate.

In addition, multiplexing of legacy traffic, sTTI traffic, and/or URLLC traffic may be considered. For example, control RB sets may be independently configured for each traffic type, block error rate (BLER) requirement, and/or latency requirement to monitor DCI scheduling them. In this case, the control RB sets may be configured equally or differently.

When two control RB sets are configured, one control RB set may be used to transmit DCI for the legacy traffic, and the other control RB set may be used to transmit DCI for the URLLC traffic. In this case, all PDCCH candidates per AL configured for each control RB set may be used to schedule traffic configured for a corresponding control RB set.

An AL configured for each control RB set, an AL set including one or more ALs, a PDCCH candidate per AL, or a PDCCH candidate set may be independently configured for each traffic type, BLER requirement and/or latency requirement. Here, the traffic type may indicate either URLLC traffic or non-URLLC traffic, and the AL configured for each control RB set, the AL set including one or more ALs, the PDCCH candidate per AL, or the PDCCH candidate set may be configured equally or differently. Such a configuration may be predefined in the system or provided by a BS to a UE through higher layer signaling and/or physical layer signaling.

For the above operation, the number of PDCCH candidates per AL allocated for non-URLLC traffic and the number of PDCCH candidates per AL allocated for URLLC traffic may be configured. However, if the same hashing function is used, a mapping relationship between PDCCH candidate indices and traffic types may need to be configured.

For example, there may be one PDCCH candidate corresponding to AL 4 for legacy traffic and one PDCCH candidate corresponding to AL 4 for URLLC traffic in a specific control RB set. In this case, if the same hashing function is used for the PDCCH candidate for the legacy traffic and the PDCCH candidate for the URLLC traffic, the PDCCH candidate allocated for the URLLC traffic may be configure to have a smaller index. Of course, the PDCCH candidate allocated for the legacy traffic may be configure to have a smaller index. For example, when the AL is 4, in the case of the URLLC traffic, the PDCCH candidate index used for the hashing function may be the first PDCCH candidate index, and in the case of the legacy traffic, the PDCCH candidate index used for the hashing function may be the second PDCCH candidate index.

When the AL is 4, if two PDCCH candidates are configured for the URLLC traffic and one PDCCH candidate is configured for the legacy traffic, the PDCCH candidate index used for the hashing function may be the first and second PDCCH candidate indices in the case of the URLLC traffic and the third PDCCH candidate index in the case of the legacy traffic. The PDCCH candidate index may be alternately allocated between the URLLC traffic and legacy traffic. Such a configuration may be predefined in the system or provided by a BS to a UE through higher layer signaling and/or physical layer signaling.

When a UE transmits and receives URLLC traffic, the UE may use more times, frequencies and/or resources to improve reliability. This may be applied to a control channel and/or a data channel. In this case, the reliability of the control channel may be affected by other components. For example, the reliability of the control channel may be limited by a channel indicating the region of the control channel, for example, the number of symbols occupied by the control channel such as a PCIFICH.

When the UE fails to decode the PCFICH, the UE may not recognize the control channel region correctly. As a result, the UE may not decode control information correctly, and the limitation may occur. To prevent this problem, if a CFI is configured by RRC signaling, the effect of a corresponding component may be eliminated. However, considering that information configured by RRC signaling may be maintained during several tens of ms, the scheduling flexibility of the network may be significantly restricted.

To reduce the restriction on the scheduling flexibility, it may be considered that the UE operates differently depending on the traffic type that the UE assumes when attempting to perform decoding.

In other words, if the UE is capable of expect both URLLC traffic and non-URLLC traffic based on UE capability, the UE may assume the control channel region based on a CFI value allocated by RRC when decoding DCI for URLLC. When attempting to decode DCI for non-URLLC, the UE may assume the control channel region based on a CFI value indicated by the PCIFICH.

In addition, the traffic type of control information to be transmitted to the UE and/or the transmission time of each traffic type of control information may be preconfigured. In this case, the transmission time of the control information may refer to a monitoring occasion.

When the UE is configured with a control RB set, the UE may receive a configuration on whether to configure a sTTI including the control RB set based on a PCFICH or a CFI value signaled by RRC together or separately.

Alternatively, the control channel region may be configured for each DCI format. When a search space is configured depending on a control RB set configured for monitoring each DCI format, each CFI value may be applied. Such a configuration may be determined on a sTTI or subframe basis.

That is, depending on the control RB set or search space configuration, when a control channel for URLLC traffic needs to be monitored for each sTTI or subframe, a CFI value based on RRC may be prioritized in sTTIs or subframes where the control channel for the URLLC traffic needs to be monitored, and a CFI value based on a PCFICH value may be prioritized in other sTTIs or subframes.

To achieve high reliability and low latency, control information may be transmitted by decreasing the length of a TTI (i.e., using a sTTI) and increasing the amount of resources. However, in this case, there may be restrictions on physical resources required for transmitting the control information.

For example, when a control RB set in a sTTI is composed of one symbol, if one CCE is composed of four REGs and one REG is composed of one RB, 64 RBs are required to support AL 16. In this case, assuming that the system bandwidth is 20 MHz, the maximum number of PDCCH candidates supported in one TTI is limited to 1.

When restrictions are imposed on the size of a search space in a control channel for a UE to reduce the processing time of the UE, support of a high AL may be disabled in the case of a single TTI, or PDCCH transmission flexibility may be degraded due to the limitation on the number of PDCCH candidates.

To improve the PDCCH transmission flexibility, methods of supporting a high AL or increasing the number of PDCCH candidates at a specific AL may be considered. Although AL 16 is assumed in the following embodiments, the present disclosure is not limited thereto. That is, the AL may have different values rather than 16, and AL 16 described herein is used to represent a high AL.

Generally, PDCCH candidates with a high AL may be configured by aggregating PDCCH candidates with a low AL included in the same TTI and/or different TTIs.

In this case, a BS may inform a UE whether the PDCCH candidates with the high AL are configured by aggregating the PDCCH candidates with the low AL through physical layer signaling and/or higher layer signaling. For example, when a UE operating with a sTTI needs to be multiplexed with a UE operating with a long TTI, the PDCCH candidates with the low AL may be aggregated. Otherwise, the PDCCH candidates with the low AL may not be aggregated. Therefore, UEs may be scheduled depending on the situation.

The BS may configure an AL and PDCCH candidates for the UE in each TTI and/or TTI set. In this case, if a configured AL fails to satisfy search space restrictions or the size of a physical resource in a corresponding TTI, the UE may configure a higher AL using search spaces in TTIs before and/or after the corresponding TTI.

For example, when the UE is configured with two PDCCH candidates corresponding to AL 16 in a specific TTI and/or TTI set, if only one PDCCH candidate is supported at AL 16 due to UE search space restrictions and/or physical resource restrictions in the corresponding TTI, the UE may further configure a PDCCH candidate for AL 16 using search spaces in TTIs before and/or after the corresponding TTI. More specifically, when two PDCCH candidates corresponding to AL 16 are configured in a specific TTI, if only one PDCCH candidates corresponding to AL 16 is supported in the corresponding TTI due to physical resource restrictions and/or UE search space restrictions, the UE may additionally configure the second PDCCH candidate for AL 16 using search spaces in TTIs before and/or after the corresponding TTI.

When the size of a search space in a TTI before and/or after a corresponding TTI is equal to or more than the number of CCEs corresponding to a high AL (16 CCEs in the above example), CCEs for configuring an additional PDCCH candidate may be selected from the TTI before and/or after the corresponding TTI.

For example, when the size of a search space in a TTI before and/or after a corresponding TTI is equal to the number of CCEs corresponding to a high (or higher) AL (16 CCEs in the above example), the entirety of the corresponding search space may be used as the second PDCCH candidate for the high (or higher) AL.

In addition, when the size of a search space in a TTI before and/or after a corresponding TTI is more than the number of CCEs corresponding to a high (or higher) AL (16 CCEs in the above example), the second PDCCH candidate for the high (or higher) AL may be configured using as many CCEs as the number of CCEs corresponding to the high (or higher) AL in the front or back of the corresponding search space.

When the size of a search space in a TTI before and/or after a corresponding TTI is less than the number of CCEs corresponding to a high (or higher) AL (16 CCEs in the above example), CCEs included in the corresponding TTI, previous TTI, and/or next TTI may be used together as CCEs for configuring an additional PDCCH candidate. In this case, it may be considered that the additional PDCCH candidate is configured depending on the AL configured per TTI and/or TTI set and the number of PDCCH candidates per AL.

For example, when an additional PDCCH candidate for a high AL (16 CCEs in the above example) is to be supported using CCEs included in a corresponding TTI, previous TTI, and/or next TTI, if there are PDCCH candidates configured for a AL (e.g., AL 8) lower than the high AL to be supported in the corresponding TTI, previous TTI, and/or next TTI, the additional PDCCH candidate for the high AL may be supported by aggregating low ALs.

More specifically, it is assumed that PDCCH candidates for AL 8 are configured in TTI #n−1 and TTI #n and two PDCCH candidates for AL 16 are to be supported in TTI #n. In this case, if only one PDCCH candidate for AL 16 is capable of being configured in TTI #n because the search space restriction is 16 CCEs, an additional PDCCH candidate for AL 16 may be configured by sequentially aggregating the PDCCH candidates for AL 8 in TTI #n−1 and TTI #n.

In the above example, if there are multiple PDCCH candidates for AL 8 in TTI #n−1 and TTI #n, PDCCH candidates for a low AL may be aggregated by interleaving, that is, by selecting a PDCCH candidate for AL 8 in TTI #n−1 as the first PDCCH candidate and a PDCCH candidate for AL 8 in TTI #n as the last PDCCH candidate, thereby improving diversity. In addition, when PDCCH candidates for a low AL are aggregated, the order of the PDCCH candidates for the low AL, an AL including aggregation PDCCH candidates, and/or the number of aggregation PDCCH candidates may be predefined in the system or provided by the BS to the UE through physical layer signaling and/or higher layer signaling.

According to the present disclosure, whether aggregation PDCCH candidates are included in a TTI before or after a corresponding TTI may be predefined in the system or provided by the BS to the UE through physical layer signaling and/or higher layer signaling.

Alternatively, it may depend on the TTI index. For example, when a corresponding sTTI has an even sTTI index, the aggregation may be performed on a search space occasion in a next sTTI. When the corresponding sTTI has an odd sTTI index, the aggregation may be performed on a search space occasion in a previous sTTI.

Meanwhile, it may be indicated that a high (higher) AL is supported using a search space in a previous TTI and/or a next TTI with CRC masking or more PDCCH candidates are supported for a specific AL. For example, when the size of a search space in a specific TTI is set to 16 CCEs, if the UE is configured with two PDCCH candidates for AL 16, the UE may know which TTI another PDCCH candidate is located in from a scrambling sequence used for CRC masking when decoding the first PDCCH candidate for AL 16 in the corresponding TTI.

In the above example, it may be considered that not only search spaces in a corresponding TTI, previous TTI, and/or next TTI but also a control RB set are used to support PDCCH candidates for a high AL in a specific TTI.

Generally, a search space for a specific TTI may be configured across different TTIs. For example, even though two PDCCH candidates for a high AL such as AL 16 are configured in the specific TTI, only one PDCCH candidate may be configured due to UE search space restrictions. In this case, the two PDCCH candidates for the high AL may be configured using control RB sets in the corresponding TTI, previous TTI, and/or next TTI together. Specifically, when the hashing function is to be applied to the corresponding TTI, the hashing function may be applied by assuming a total size as the sum of the sizes of the control RB sets in the corresponding TTI, previous TTI, and/or next TTI.

Here, the hashing function applied to the total size may be the hashing function defined in the corresponding TTI. In other words, when blind decoding of PDCCH candidates for all ALs is performed in the corresponding TTI where the PDCCH candidates for the high AL are configured over the UE search space restrictions, the hashing function where the sizes of the control RB sets in the multiple TTIs are combined may be applied. Alternatively, it may be applied only when the blind decoding is performed for some PDCCH candidates for a high AL, which are not supported in the corresponding TTI.

In this case, the order of aggregating the control RB sets in the corresponding TTI, previous TTI, and/or next TTI may be predefined in the system or provided by the BS to the UE through physical layer signaling and/or higher layer signaling.

For example, the BS may instruct the UE to aggregate the control RB sets in the order where the control RB sets for decoding the PDCCH candidates for the high AL are included in the TTIs through physical layer signaling and/or higher layer signaling.

The term "previous TTI and/or next TTI" used herein may not necessarily indicate a TTI immediately before and/or after a corresponding TTI. For example, when a monitoring occasion is configured for each TTI spaced at a specific interval, it may indicate a previous monitoring TTI and/or a next monitoring TTI. Further, the above-described embodiments are also applicable when TTIs are separated from each other.

Figure 20:
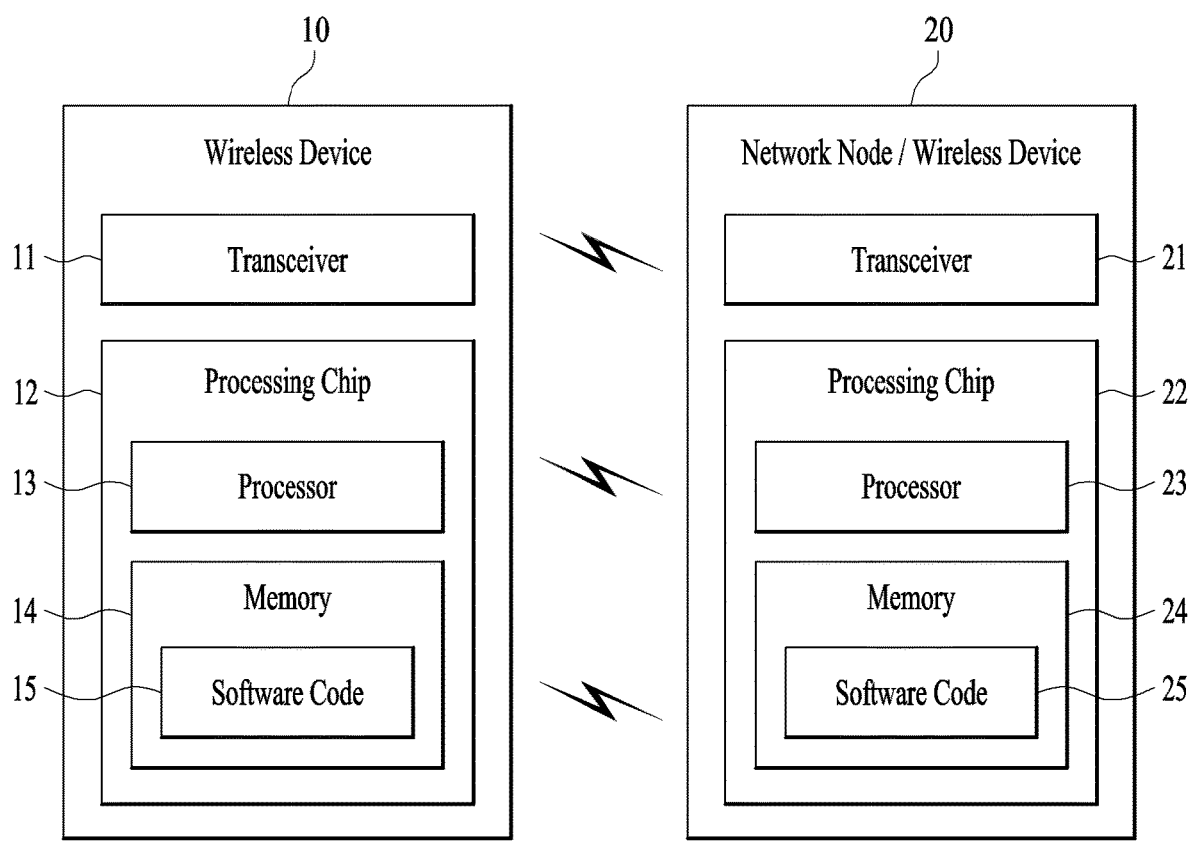
FIG. 20 is a block diagram illustrating components of wireless devices for implementing the present disclosure.

FIG. 20 is a block diagram illustrating an example of communication between a wireless device 10 and a network node 20. Here, the network node 20 may be replaced with the wireless device of FIG. 20 or a UE.

In this specification, the wireless device 10 or the network node 20 includes a transceiver 11, 21 for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of the processing chips 12 and 22 or to receive wireless signals from the outside and transmit the signals to the processing chips 12 and 22, according to an embodiment of the present disclosure. The antennas are also referred to as antenna ports. Each antenna may correspond to one physical antenna or be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present disclosure, the transceivers 11 and 21 may support reception beamforming and transmission beamforming. For example, in the present disclosure, the transceivers 11 and 21 may be configured to perform the functions illustrated in FIGS. 16 to 18.

In addition, the wireless device 10 or the network node 20 includes a processing chip 12, 22. The processing chips 12 and 22 may include at least one processor, such as a processor 13, 23, and at least one memory device, such as a memory 14, 24.

The processing chips 12 and 22 may control at least one of the methods and/or processes described herein. In other words, the processing chips 12 and 22 may be configured to implement at least one of the embodiments described herein.

The processors 13 and 23 include at least one processor for performing the function of the wireless device 10 or the network node 20 described herein.

For example, one or more processors may control the one or more transceivers 11 and 21 of FIG. 20 to transmit and receive information.

The processors 13 and 23 included in the processing chips 12 and 22 perform predetermined coding and modulation on signals and/or data to be transmitted to the outside of the wireless device 10 or the network node 20, and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a code word and is equivalent to a transport block, which is a data block provided by the MAC layer. One transport block (TB) is coded into one code word, and each code word is transmitted to a reception device in the form of one or more layers. To perform frequency up-conversion, the transceivers 11 and 21 may include an oscillator. The transceivers 11 and 21 may include $N_t$ transmit antennas (where $N_t$ is a positive integer greater than or equal to 1).

In addition, the processing chips 12 and 22 include a memory 14, 24 configured to store data, programmable software code, and/or other information for implementing the embodiments described herein.

In other words, in the embodiments according to the present disclosure, when the memories 14 and 24 are executed by at least one processor, such as the processors 13 and 23, the memories allow the processors 13 and 23 to execute some or all of the processes controlled by the processors 13 and 23 of FIG. 20, or store software codes 15 and 25 including instructions for implementing the embodiments described herein based on FIGS. 1 to 19.

Specifically, according to the embodiments of the present disclosure, the processing chip 12 of the wireless device 10 may be configured to control the transceiver 11 to receive at least one PDCCH for scheduling a repeated PDSCH and obtain information related to a rate matching pattern from the received at least one PDCCH. In this case, the PDCCH for scheduling the repeated PDSCH may be transmitted once or repeatedly.

The processing chip 12 may be configured to receive the repeated PDSCH based on the obtained information related to the rate matching pattern. In this case, how the rate matching pattern is applied to the repeated PDSCH may be determined according to Embodiments 1-1 to 1-4 and/or Embodiments 2-1 to 2-3, which are described above.

According to the embodiments of the present disclosure, the processing chip 22 of the network node 20 may be configured to control the transceiver 12 to transmit information on a rate matching pattern for a repeated PDSCH on at least one PDCCH for scheduling the repeated PDSCH. A BS may control the transceiver 12 to repeatedly transmit the PDSCH in a plurality of TTIs based on the information on the rate matching pattern. In this case, the PDCCH for scheduling the repeated PDSCH may be transmitted once or repeatedly. How the rate matching pattern is applied to the repeated PDSCH may be determined according to Embodiments 1-1 to 1-4 and/or Embodiments 2-1 to 2-3, which are described above.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method for transmitting and receiving a downlink data channel and device therefor are described based on the 3GPP LTE system, the method and apparatus are applicable to various wireless communication systems as well as the 3GPP LTE system.

The invention claimed is:

1. A method of receiving a physical downlink shared channel (PDSCH) by a user equipment (UE) in a wireless communication system, the method comprising:
receiving, in a first short transmission time interval (sTTI), a physical downlink control channel (PDCCH) that comprises (i) information for scheduling k repetitions of the PDSCH and (ii) rate matching information for the PDSCH;
receiving the PDSCH repeatedly in the first sTTI and (k−1) second sTTI subsequent to the first sTTI, based on the rate matching information; and
transmitting, in a third sTTI, a Hybrid Automatic Repeat Request-Acknowledgement (HARQ-ACK) for the repeatedly received PDSCH,
wherein the rate matching information is identically used for each of the first sTTI and the (k−1) second sTTI, and
wherein the third sTTI for transmitting the HARQ-ACK is determined based on a last of the (k−1) second sTTI in which the PDSCH was repeatedly received.

2. The method of claim 1, wherein the PDSCH repeatedly received in the first sTTI and the (k−1) second sTTI is for a same transport block (TB).

3. A communication device configured to receive a physical downlink shared channel (PDSCH) in a wireless communication system, the communication device comprising:
at least one processor; and
at least one computer-readable storage medium storing instructions that, based on being executed by the at least one processor, control the communication device to:
receive, in a first short transmission time interval (sTTI), a physical downlink control channel (PDCCH) that comprises (i) information for scheduling k repetitions of the PDSCH and (ii) rate matching information for the PDSCH;
receive the PDSCH repeatedly in the first sTTI and (k−1) second sTTI subsequent to the first sTTI, based on the rate matching information; and
transmit, in a third sTTI, a Hybrid Automatic Repeat Request-Acknowledgement (HARQ-ACK) for the repeatedly received PDSCH,
wherein the rate matching information is identically used for each of the first sTTI and the (k−1) second sTTI, and
wherein the third sTTI for transmitting the HARQ-ACK is determined based on a last of the (k−1) second sTTI in which the PDSCH was repeatedly received.

4. The communication device of claim 3, wherein the PDSCH repeatedly received in the first sTTI and the (k−1) second sTTI is for a same transport block (TB).

5. A method of transmitting a physical downlink shared channel (PDSCH) by a base station (BS) in a wireless communication system, the method comprising:
transmitting, in a first short transmission time interval (sTTI), a physical downlink control channel (PDCCH) that comprises (i) information for scheduling k repetitions of the PDSCH and (ii) rate matching information for the PDSCH;
transmitting the PDSCH repeatedly in the first sTTI and (k−1) second sTTI subsequent to the first sTTI, based on the rate matching information; and
receiving, in a third sTTI, a Hybrid Automatic Repeat Request-Acknowledgement (HARQ-ACK) for the repeatedly transmitted PDSCH,
wherein the rate matching information is identically used for each of the first sTTI and the (k−1) second sTTI, and
wherein the third sTTI for receiving the HARQ-ACK is based on a last of the (k−1) second sTTI in which the PDSCH was repeatedly transmitted.

6. The method of claim 1, wherein the rate matching information is identically used for each of the first sTTI and the (k−1) second sTTI such that:
a rate matching applied to any of the (k−1) second sTTI is identical to a rate matching applied to the first sTTI.

7. The method of claim 1, wherein the PDCCH includes a value of a Redundancy Version (RV) for the first sTTI, and wherein the value of the RV is related to a location of the first sTTI.

* * * * *